US008267455B1

(12) United States Patent  (10) Patent No.: US 8,267,455 B1
Ludwick  (45) Date of Patent: Sep. 18, 2012

(54) EXPANDABLE TRAILER

(76) Inventor: Eric Ludwick, Mishawaka, IN (US)

( * ) Notice: Subject to any disclaimer, the term of this patent is extended or adjusted under 35 U.S.C. 154(b) by 0 days.

(21) Appl. No.: 12/892,246

(22) Filed: Sep. 28, 2010

(51) Int. Cl.
 *B60P 3/34* (2006.01)
(52) U.S. Cl. ............................................. 296/26.04
(58) Field of Classification Search ........... 296/26.04, 296/26.05, 26.12, 26.13, 156, 164, 165, 168, 296/171, 172, 175, 176
 See application file for complete search history.

(56) References Cited

U.S. PATENT DOCUMENTS

| | | | |
|---|---|---|---|
| 2,739,833 A | 3/1956 | Schenkel et al. | |
| 2,862,759 A | 12/1958 | Huth | |
| 3,363,932 A * | 1/1968 | Mann | 296/164 |
| 3,560,043 A * | 2/1971 | Harter | 296/171 |
| 3,596,416 A | 8/1971 | Hojka | |
| 3,608,954 A * | 9/1971 | Lynd | 296/164 |
| 3,850,470 A | 11/1974 | Trelle | |
| 3,941,414 A | 3/1976 | Platt | |
| 4,930,837 A | 6/1990 | Marsh et al. | |
| 4,958,874 A | 9/1990 | Hegedus | |
| 5,154,469 A | 10/1992 | Morrow | |
| 5,374,094 A | 12/1994 | Smith et al. | |
| 5,785,373 A | 7/1998 | Futrell et al. | |
| 5,787,650 A | 8/1998 | Miller et al. | |
| 5,915,774 A | 6/1999 | Tiedge | |
| 5,967,583 A | 10/1999 | Wishart | |
| 6,098,346 A | 8/2000 | Miller et al. | |
| 6,135,525 A | 10/2000 | Amann | |
| 6,224,126 B1 | 5/2001 | Martin et al. | |
| 6,302,475 B1 | 10/2001 | Anderson | |
| 6,619,714 B2 | 9/2003 | Schneider et al. | |
| 6,623,058 B1 * | 9/2003 | Crean | 296/26.13 |
| 6,644,719 B2 | 11/2003 | Young, Sr. | |
| 6,692,062 B1 | 2/2004 | Woodard et al. | |
| 6,712,414 B2 | 3/2004 | Morrow | |
| 6,722,726 B1 | 4/2004 | Parmer | |
| 6,729,678 B1 | 5/2004 | Atcravi | |
| 6,755,460 B1 | 6/2004 | Marrs et al. | |
| 7,017,975 B2 | 3/2006 | Parmer | |
| 7,150,483 B2 | 12/2006 | Rasmussen | |
| 7,226,116 B2 | 6/2007 | Jones | |
| 7,234,747 B2 | 6/2007 | Rasmussen | |
| 7,234,759 B1 * | 6/2007 | Alohali | 296/168 |
| 7,328,927 B1 * | 2/2008 | Crean | 296/26.13 |
| 7,469,949 B2 | 12/2008 | Harder, Jr. et al. | |
| 7,644,971 B1 * | 1/2010 | Ludwick | 296/26.02 |
| 2003/0085562 A1 | 5/2003 | Sparling | |
| 2006/0131912 A1 | 6/2006 | MacLean | |

FOREIGN PATENT DOCUMENTS

| | | |
|---|---|---|
| CA | 2180038 | 12/1997 |
| EP | 0 317 357 | 5/1989 |

OTHER PUBLICATIONS

Web page illustration and photos from web site illustrating Expandible Trailer System; Valid Manufacturing, Ltd.; copyright 2005. Wayback Machine Internet Archives has this webpage: http://www.validmanufacturing.com/index.php?pid=18, dated as Jun. 27, 2007.

* cited by examiner

*Primary Examiner* — H Gutman
(74) *Attorney, Agent, or Firm* — Botkin & Hall, LLP

(57) ABSTRACT

An expandable trailer having a lower body portion having a first floor, a front wall, a back wall and a pair of opposite side walls. The trailer also has an upper body portion that is disposed over the lower body portion. The body portion has an upper segment and a lower segment that is connected to the lower body portion. The upper segment has a front wall, a back wall, a pair of opposite side walls, and a roof. The upper segment is movable relative to the lower segment such that the upper segment has a raised and lowered position relative to the lower body portion. The trailer may contain multiple floors defining separate living areas. The trailer may also have expandable rooms in the lower body portion which are slidingly retained within the lower body portion and provide additional room within the lower body portion.

4 Claims, 27 Drawing Sheets

US 8,267,455 B1

EXPANDABLE TRAILER

BACKGROUND OF THE INVENTION

Interior space of trailers is limited by size restrictions to vehicles traveling on public roads. In the past, expandable sides were used to widen trailers when they are parked. During travel along public roads, the sides of the trailer are retracted to meet the size limits for use on public roads. The interior space of a trailer can be nearly doubled if a second story were affixed on top of an existing trailer. However, a fixed second story is not a viable solution due to necessary clearance required to pass under bridges. Fifth wheel trailers are particularly limited in space since a significant amount of space at the front of the trailer is typically consumed by a goose neck portion that rises up from the main floor to leave an area which is not usable as ordinary living space due to the short distance between the raised floor and the ceiling.

SUMMARY OF THE INVENTION

This invention relates to an expandable trailer. The trailer of this invention has a lower body portion having a first floor, a front wall, a back wall and a pair of opposite side walls. The trailer also has an upper body portion that is disposed over the lower body portion. The upper body portion has an upper segment and a lower segment that is connected to the lower body portion. The lower segment has a front wall, a back wall and a pair of opposite side walls. The upper segment has a front wall, a back wall, a pair of opposite side walls, and a roof. The upper segment is movable relative to the lower segment such that the upper segment has a raised and lowered position relative to the lower body portion. An actuator is used to raise and lower the upper segment relative to the lower segment. The trailer may contain multiple floors defining separate living areas. The trailer may also have expandable rooms in the lower body portion which are slidingly retained within the lower body portion and provide additional room within the lower body portion.

Another embodiment includes an upper segment which accommodates upper extendable rooms that provide for lateral expansion. The upper expandable rooms are slidably retained within the upper segment, and expand upward with the upper segment.

Another embodiment has extendable rooms in the upper segment and lower body portion. These rooms have separate floors and roofs from one another and do not have to be extended out simultaneously.

Another embodiment has extendable rooms that are vertically aligned and extend simultaneously from the upper segment and lower body portion of the motor home.

DETAILED DESCRIPTION OF INVENTION

Figure 1:
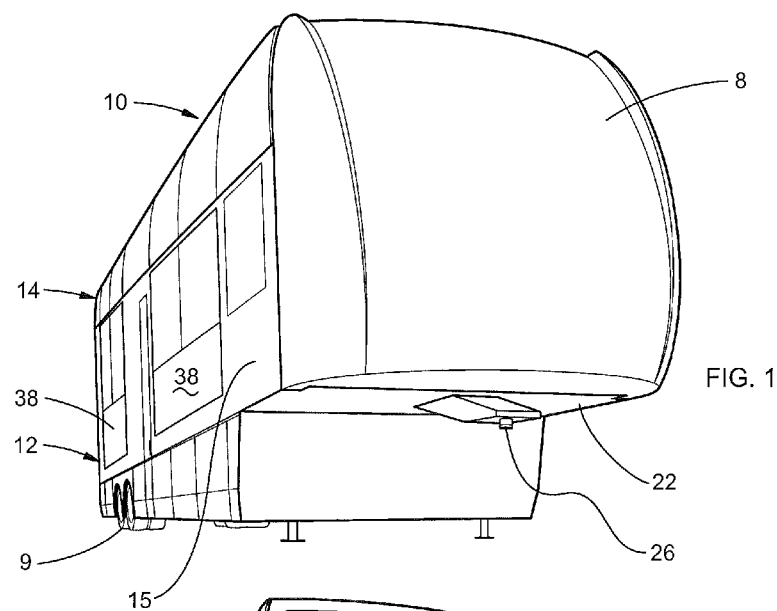
FIG. 1 is a perspective view of an embodiment of the expandable trailer of this invention with its upper segment in its lowered position and the extendable rooms in their retracted positions.
Figure 2:
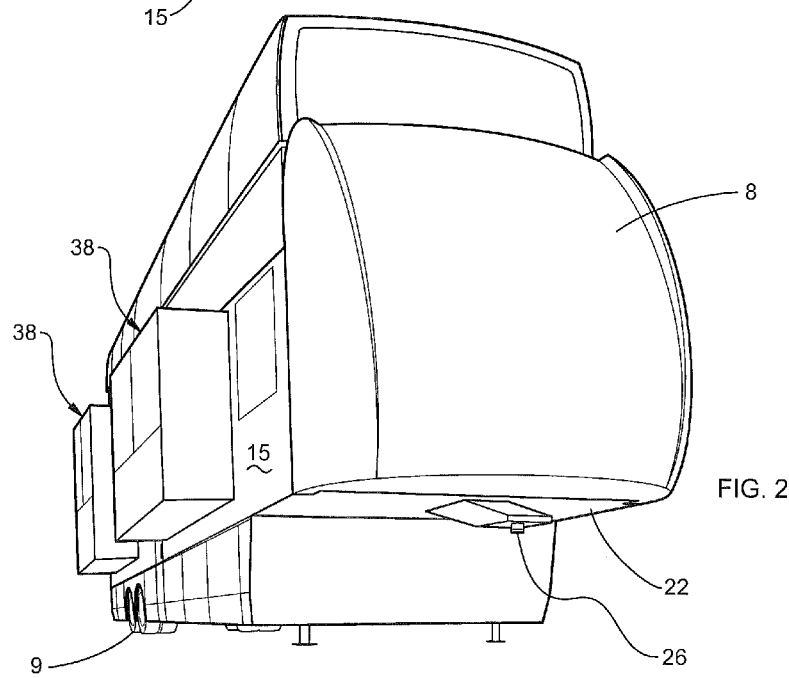
FIG. 2 is a perspective view of the trailer shown in FIG. 1 with the upper segment in its raised position and the extendable rooms in their extended positions.
Figure 3:
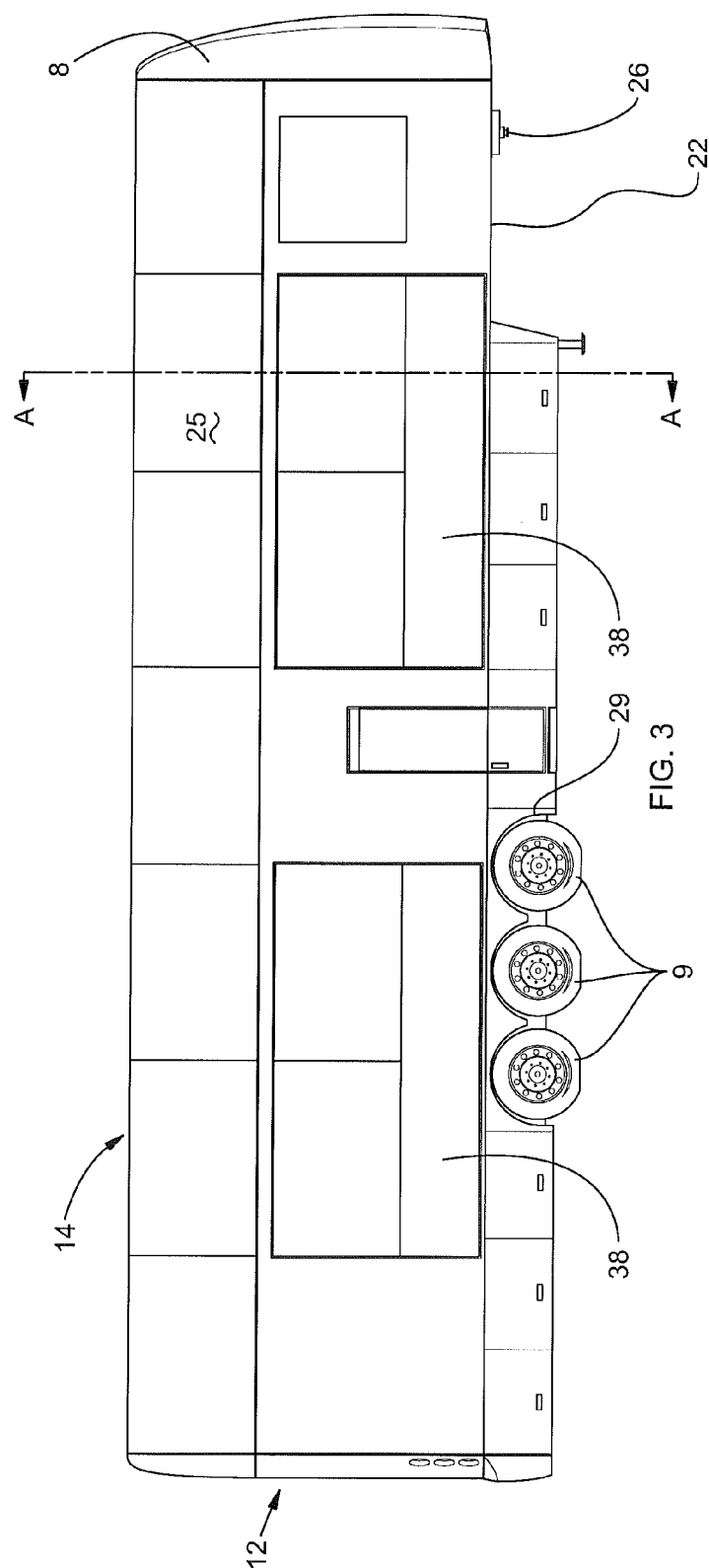
FIG. 3 is a side view of the trailer shown in FIG. 1 with the upper segment in its lowered position.

The expandable trailer 10 of this invention has a lower body portion 12 placed on top of wheels 9 and an upper body portion 14 placed upon the lower body portion 12. The lower body portion 12 has a first floor 13, opposite side walls 15, a front wall 11, a back wall 21 and a goose neck portion 22. The gooseneck portion 22 has a kingpin 26 for connecting with a fifth wheel hitch that is not shown. The first floor 13 is a continuous plane extending from the back wall 21 to the front wall 11 of the lower body portion. This enables users of the trailer 10 to move throughout the first floor living area 16 without having to step up or down. The portion of the first floor 13 extending into the gooseneck section 22 is at the same level as the rest of the first floor 13. More room is provided on the first floor living area 16 due to the fact that the wheel wells 29 are below the floor and do not require boxes extending from the floor to cover the wheels 9. The first floor 13, being level along its entire length, provides room below the first floor 13 for storage areas 31 that do not take space from the first floor living area 16. The lower body portion 12 also has a nose portion 8 extending above the front wall 11. The nose portion 8 is aerodynamically shaped to reduce wind resistance. The upper body portion 14 has two sub components which are an upper segment 18 and a lower segment 20. The upper segment 18 has a roof 19, a front wall 24, a back wall 23, and a pair of opposite side walls 25. The lower segment 20 has a second floor 28, opposite side walls 30, a front wall 32, and a back wall 34. The lower segment 20 is fixed to the lower body portion 12. The upper segment 18 is movably engaged on the lower segment 20. Actuators, which may be hydraulic cylinders 17, are used to raise the upper segment 18 from its fully lowered position. Although hydraulic cylinders 17 are shown, other actuators can be used to raise the upper segment 18. Such other actuators for raising the upper segment may include, but are not limited to, screw drives or rack and pinion assemblies. Typically, there are at least four actuators near the corners of the upper body portion 14, but more can be used, if necessary. Six hydraulic cylinders 17 are used as actuators to lift the upper segment 18. Three of the hydraulic cylinders 17 are shown in the sectional view FIG. 4.

Figure 8:
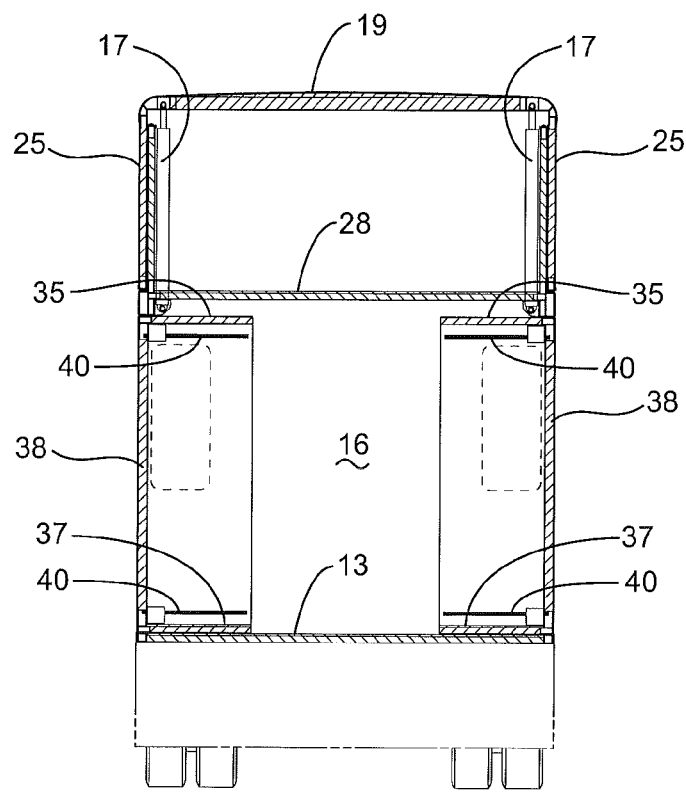
FIG. 8 is a sectional view taken about the line A-A in FIG. 3.
Figure 9:
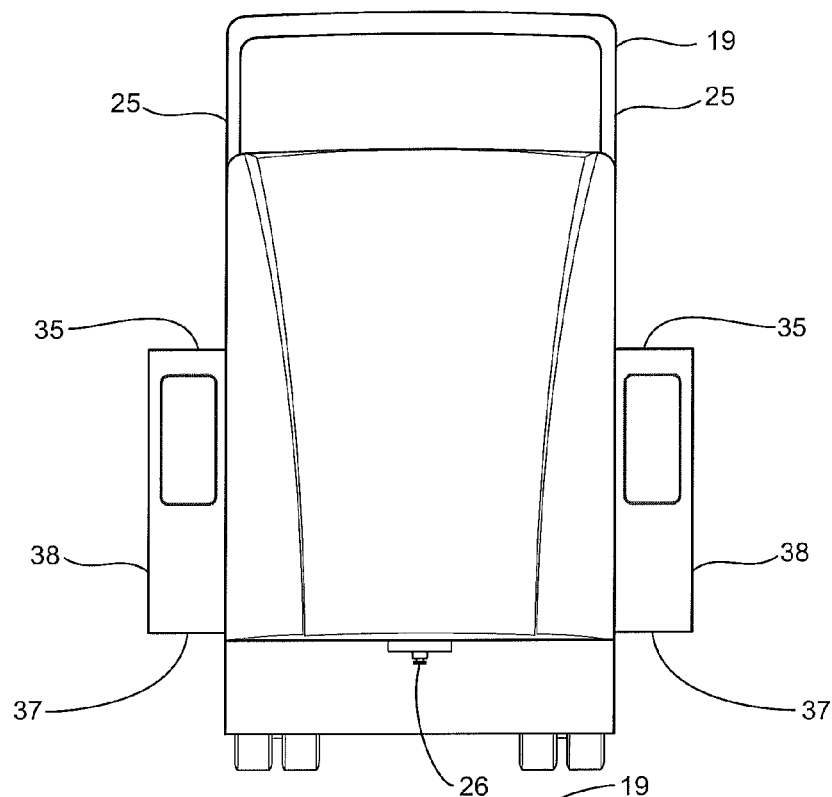
FIG. 9 is a front view of the trailer shown in FIG. 1 with the upper segment in its raised position and the extendable rooms in their extended positions.

The lower body portion 12 may include extendable rooms 38. These rooms are well known in the recreational vehicle art and may be moved in and out of a vehicle with the use of many different types of actuators. FIG. 8 shows the use of screw drives 40 as actuators to move the extendable rooms 38, but actuators such as rack and pinion assemblies, hydraulics, or others may also be used.

Figure 4:
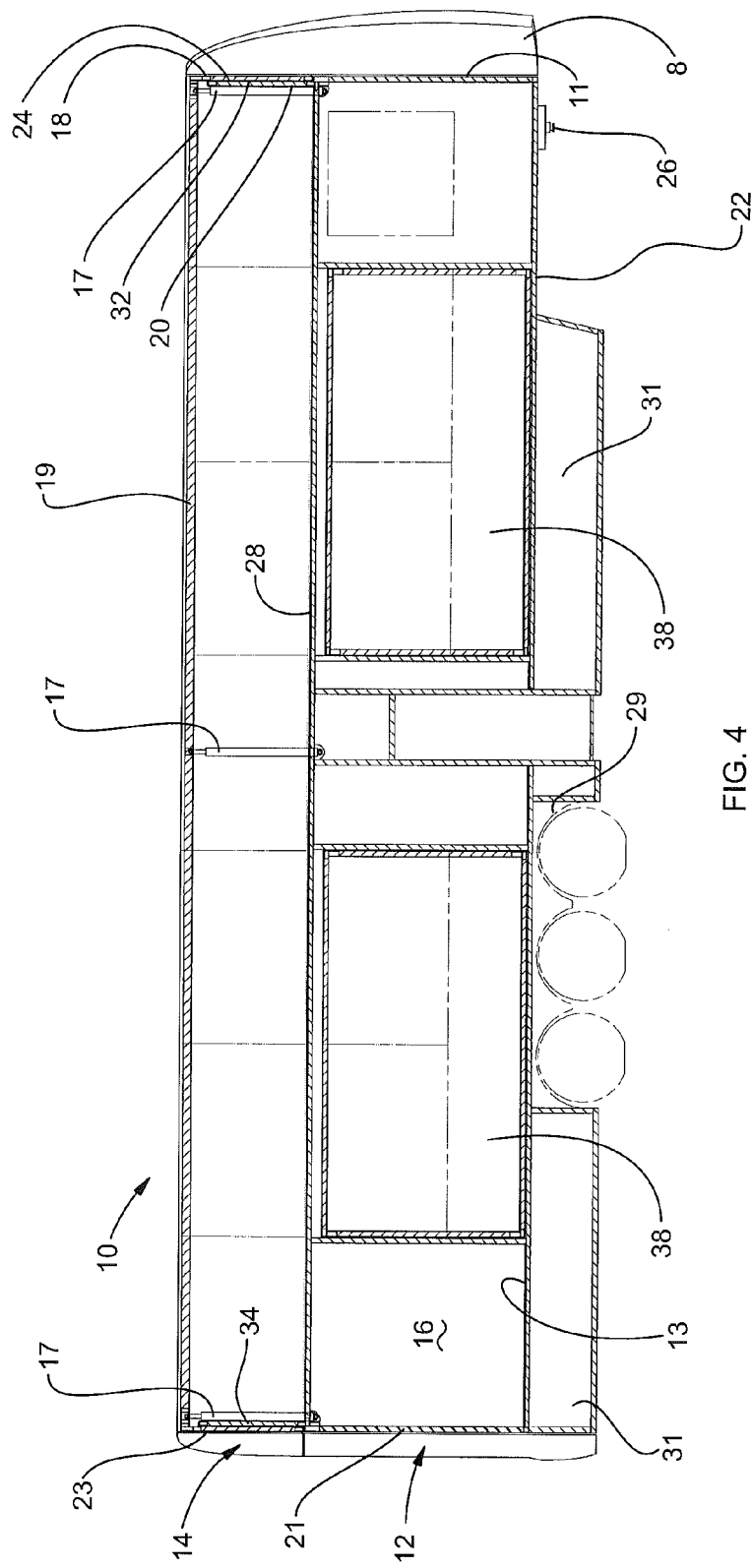
FIG. 4 is a sectional view of the trailer shown in FIG. 3 taken longitudinally along the center of the trailer.
Figure 5:
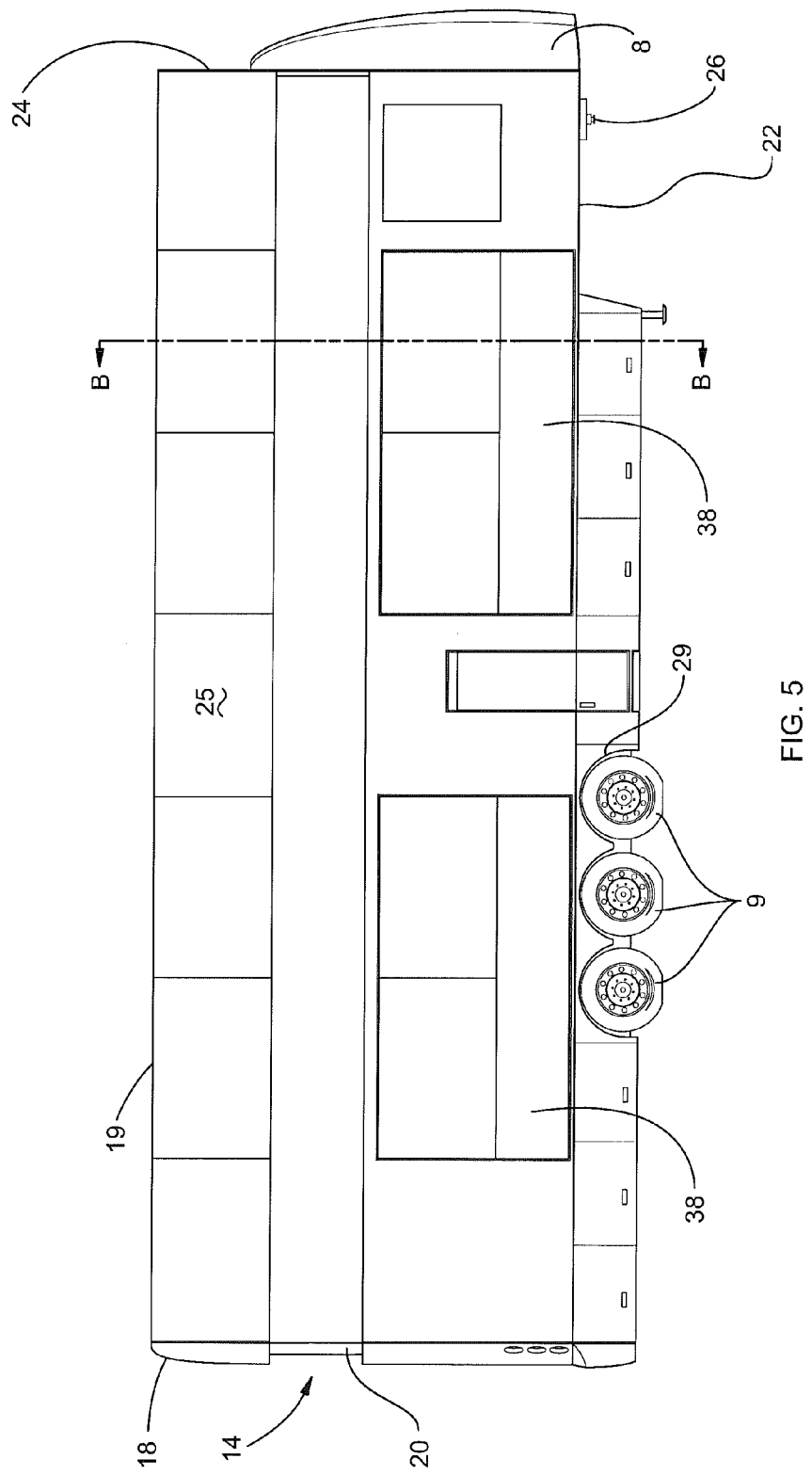
FIG. 5. is a side view of the trailer shown in FIG. 1 with the upper segment in its raised position.
Figure 6:
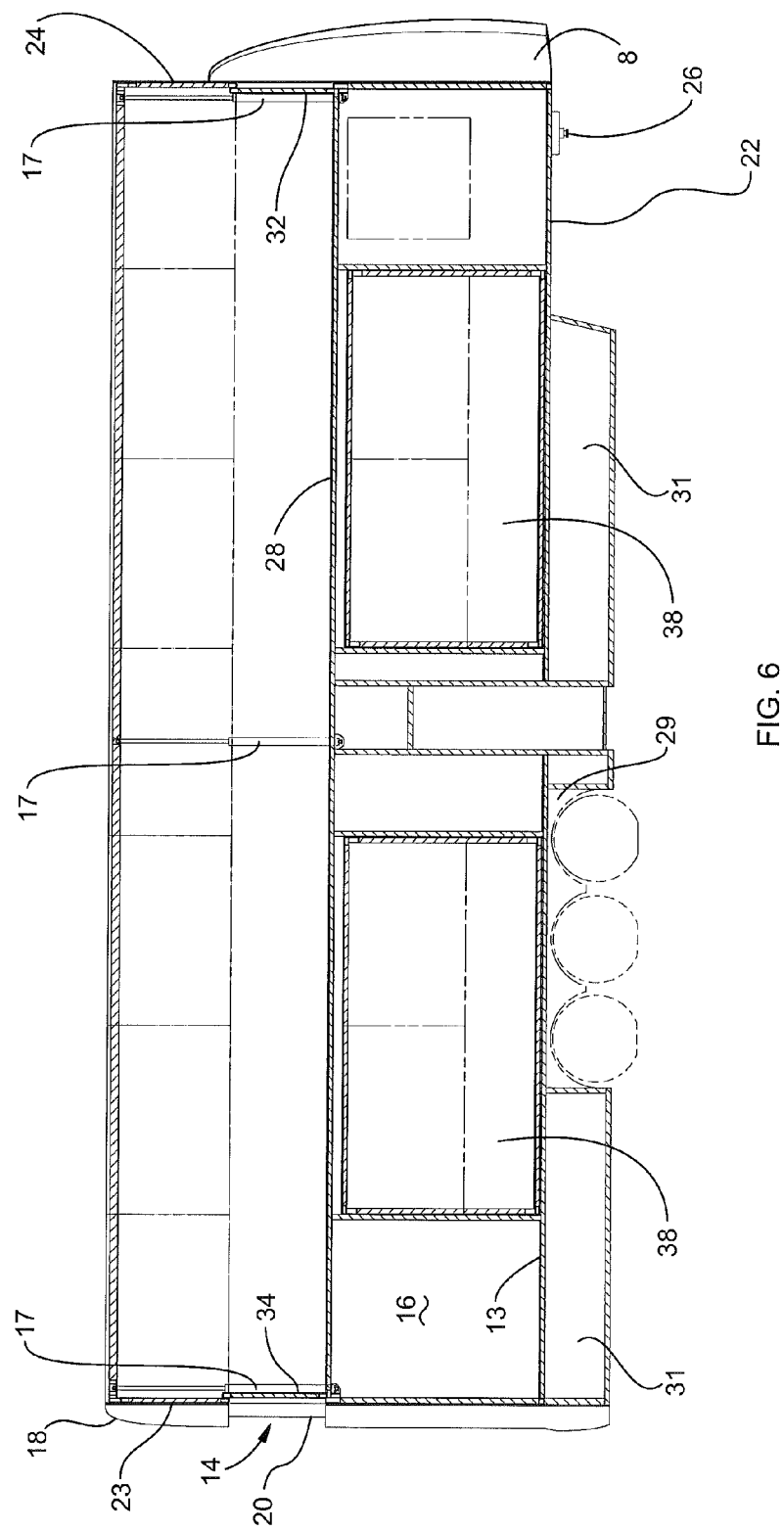
FIG. 6 is a sectional view of the trailer shown in FIG. 5 with the upper segment in its raised position.
Figure 7:
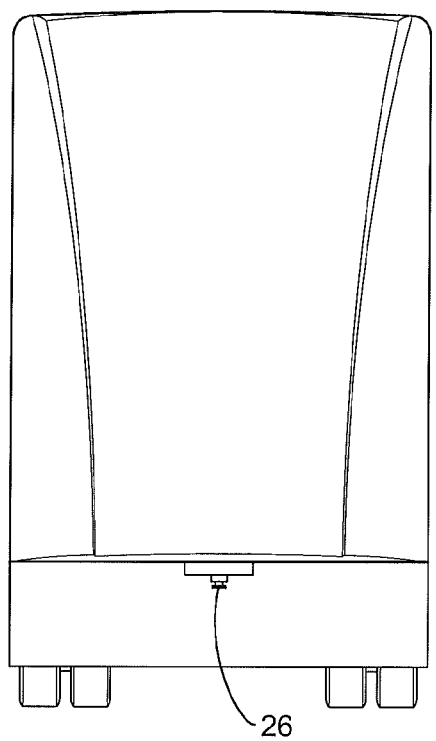
FIG. 7 is a front view of the trailer shown in FIG. 1.
Figure 10:
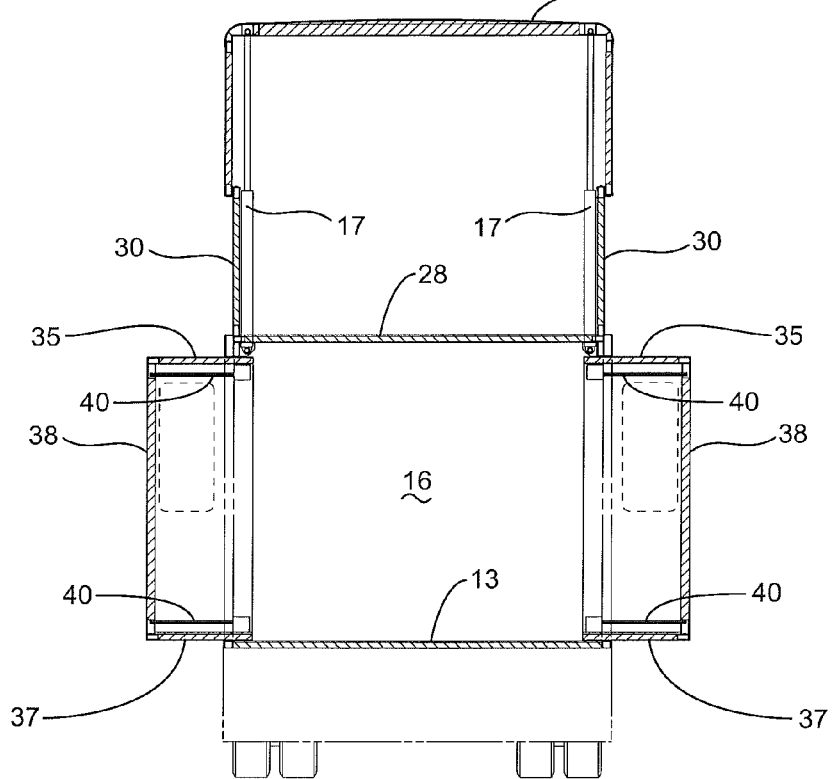
FIG. 10 is a sectional view taken about the line B-B in FIG. 5.
Figure 11:
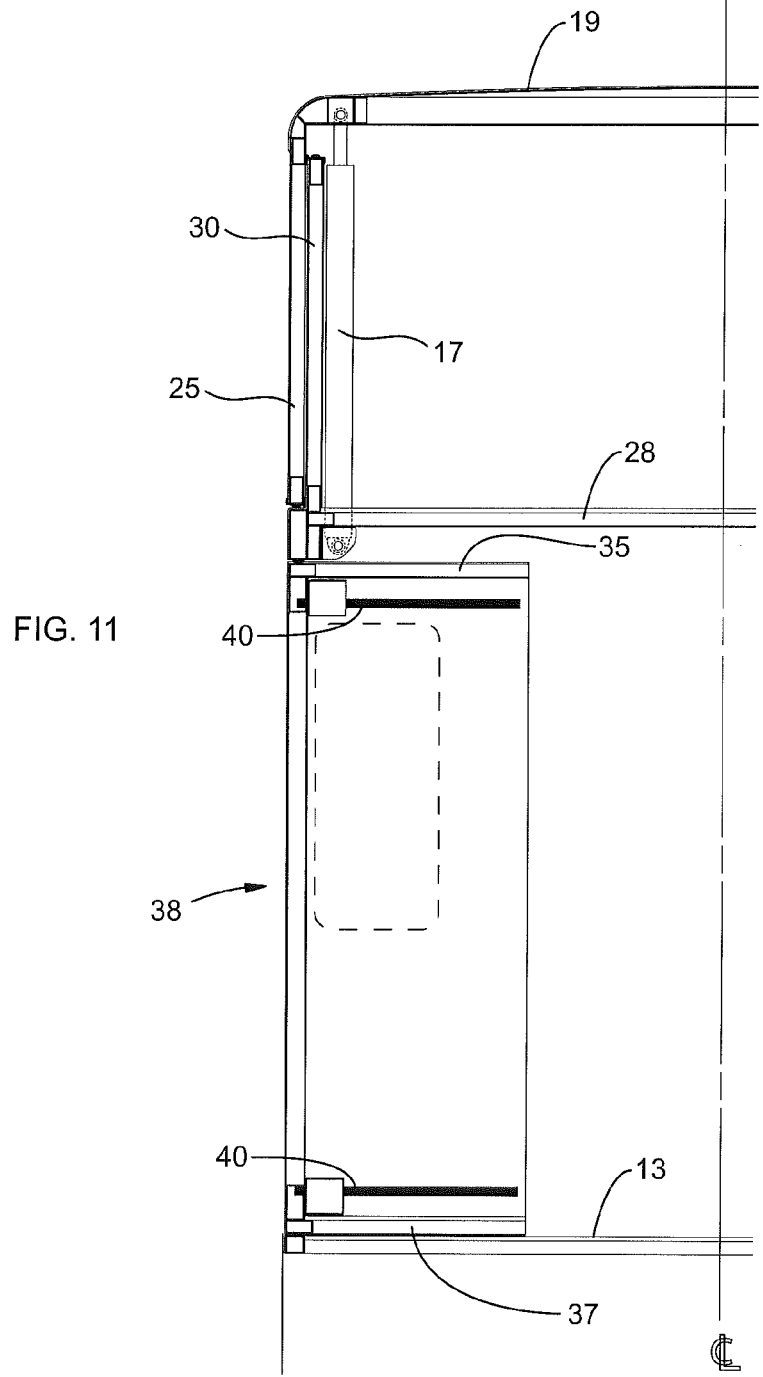
FIG. 11 is a sectional view taken about the line A-A in FIG. 3.

In an embodiment, as shown in FIGS. 1-12, the side walls 25 of the upper segment 18 are continuous and do not accommodate extendable rooms. The side walls 15 of the lower body portion 12 in the first embodiment accommodate extendable rooms 38. The extendable rooms 38 each have a roof 35 and a floor 37 that slide within the lower body portion. The upper segment 18 and second floor 28 define an upper living area 41. FIGS. 1, 7, 8, and 11 show the upper segment 18 in its fully lowered position. The upper segment 18 overlaps the lower segment 20. The upper segment 18 is designed to be flush with the side wall 15 of the lower body portion 12 in its lowered position, which provides a streamlined surface. The front of the trailer 10 is streamlined due to the fact that when the upper segment 18 is in its lowered position, the front wall 24 of the upper segment 18 retracts behind the nose portion 8 so that no portion of the front wall 24 remains exposed. As such, when the trailer is being towed, it will be much more aerodynamic than if the flat front wall 24 was exposed. This is shown in FIG. 4. FIG. 11 shows in detail how actuators are mounted in this embodiment to raise the upper segment 18, and how actuators 40 are mounted to extend the rooms 38.

Figure 12:
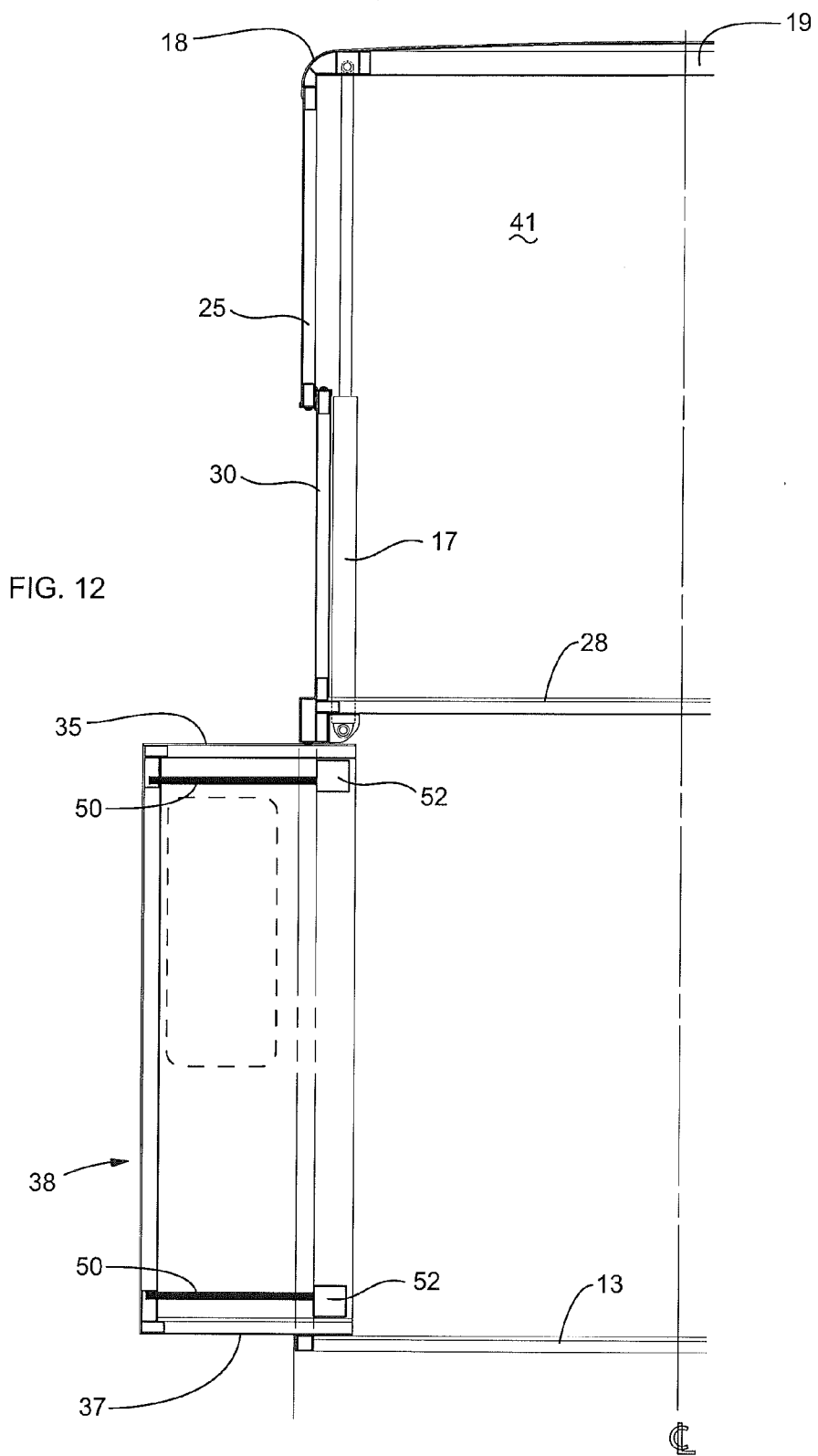
FIG. 12 is a sectional view taken about the line B-B in FIG. 5.
Figure 13:
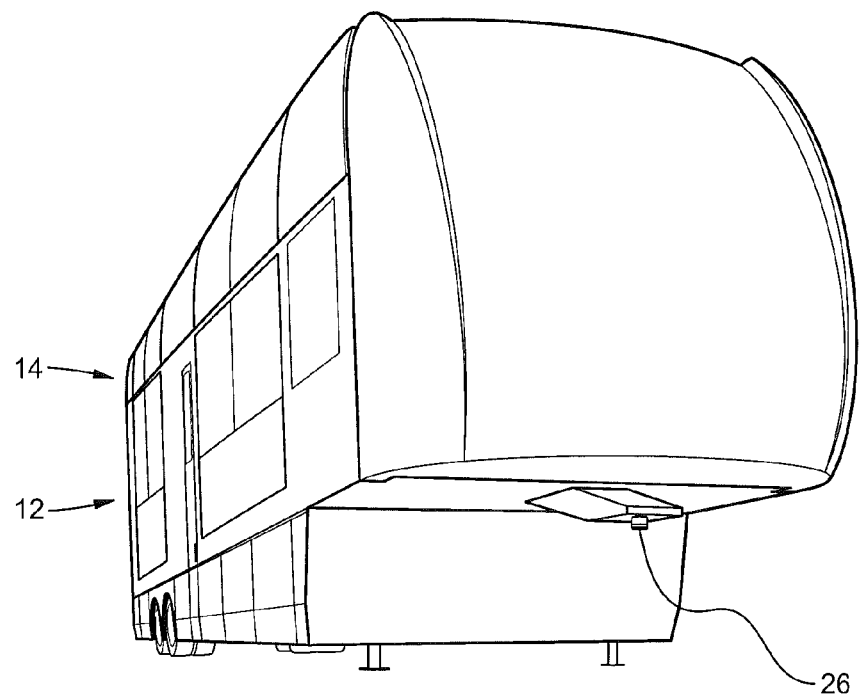
FIG. 13 is a perspective view of another embodiment of the expandable trailer of this invention with its upper segment in its lowered position and the extendable rooms in their retracted positions.
Figure 14:
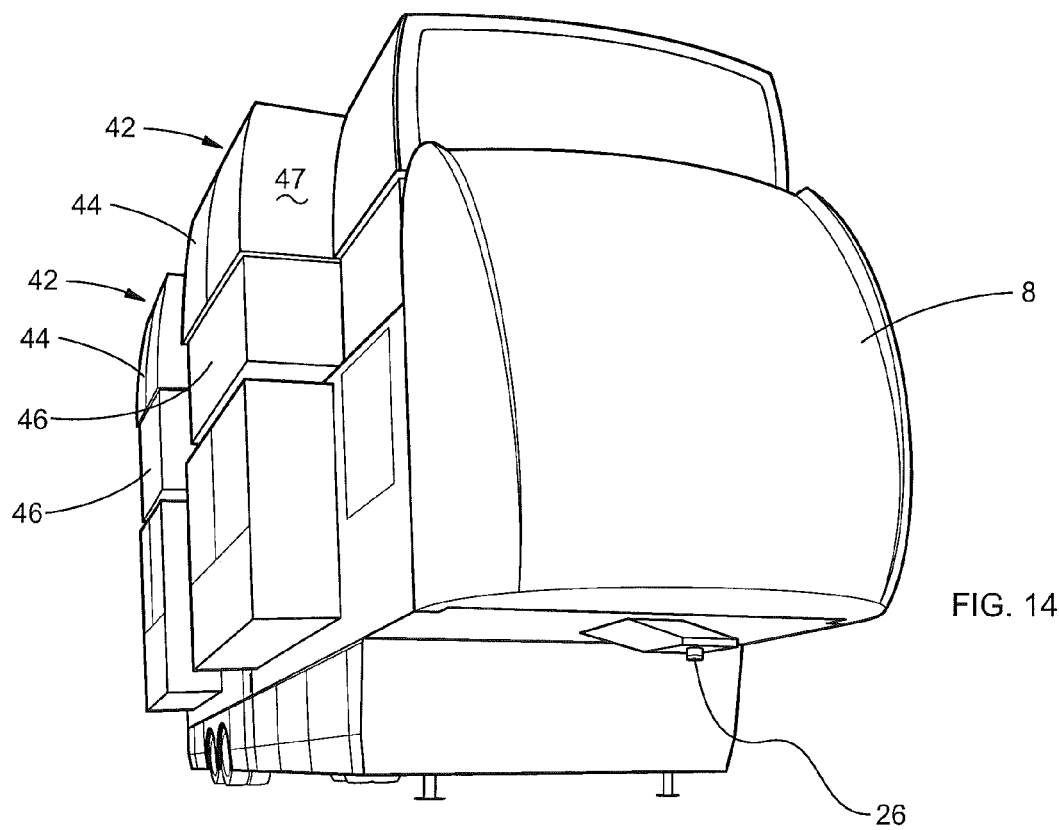
FIG. 14 is a perspective view of the trailer shown in FIG. 13 with the upper segment in its raised position and the extendable rooms in their extended positions.
Figure 15:
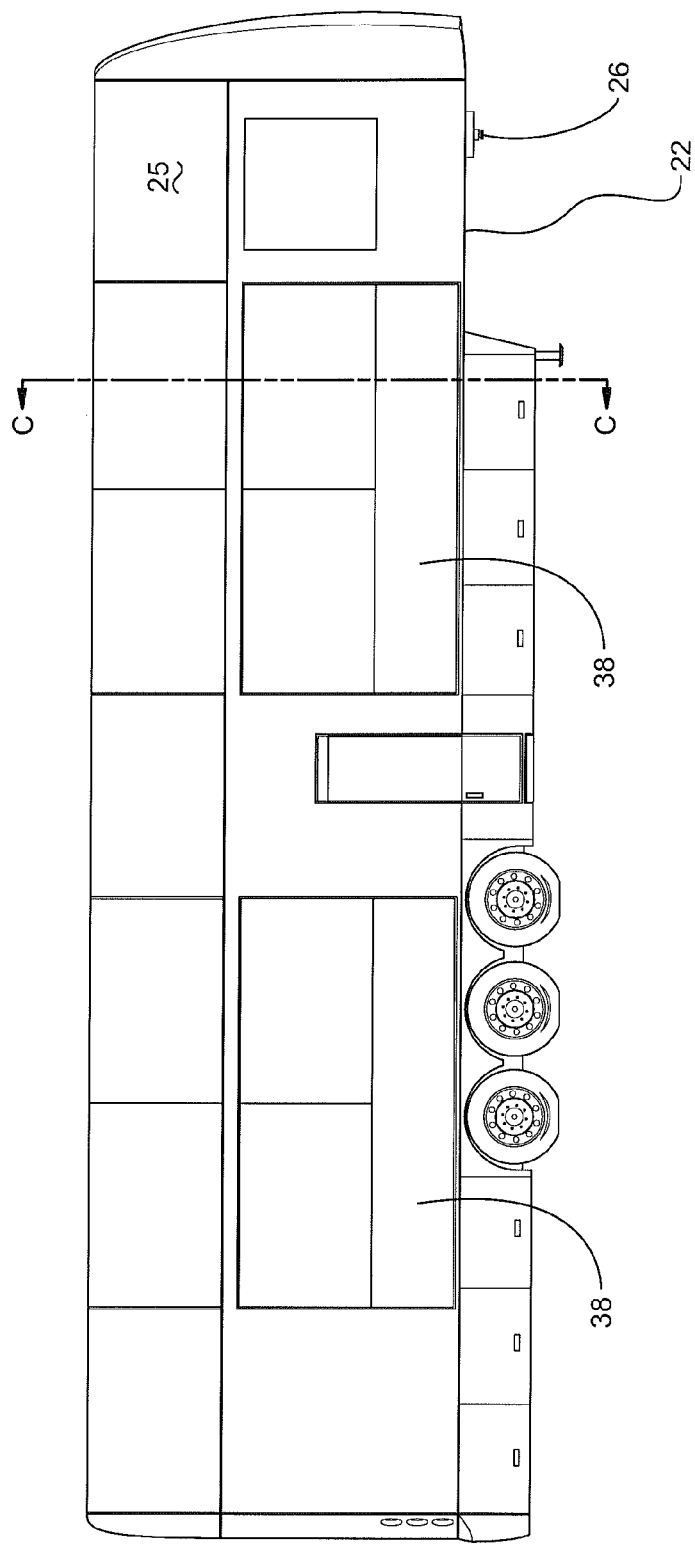
FIG. 15 is a side view of the trailer shown in FIG. 13 with the upper segment in its lowered position.

The side walls 25 of the upper segment 18 are in a side by side relationship with the side walls 30 of the lower segment 20 when the upper segment 18 is in its lowered position. This relationship is shown in FIGS. 4 and 8. When the trailer is to be moved, the upper segment 18 will be in its lowered position, shown in FIGS. 4 and 8. Because the front wall 24 of the upper segment is recessed behind the nose portion 8 when the upper segment 18 is in its lowered position, water will not be driven into the upper living area 41 if the trailer 10 is moved while it is raining. When using hydraulic cylinders 17 to lift the upper segment 18, an upper end of the hydraulic cylinder 17 is mounted to the roof 19 and a lower end of the hydraulic cylinder 17 is mounted to a stationary location of the lower body portion. Fluid is supplied to the hydraulic cylinders 17 which lifts the upper segment 18. As the upper segment 18 raises, the side walls 25 move past the stationary sidewalls 30 in a telescoping manner. When the top is fully raised, as shown in FIGS. 10 and 12, there is some overlapping that provides a sealed upper living area 41.

The extendable rooms 38 slide between extended and retracted positions within the side walls 15 of the lower body portion 12. When a screw drive 40 is used, a motor/gear box housing 52 is mounted to a stationary part of the side wall 15 and a threaded rod is mounted to the room 38. As the motor turns, the threaded rod 50 is drawn through the housing 52, as is well known in the art. Depending on which way the motor turns, the threaded rod 50 will either extend the room 38 or retract the room 38.

Figure 16:
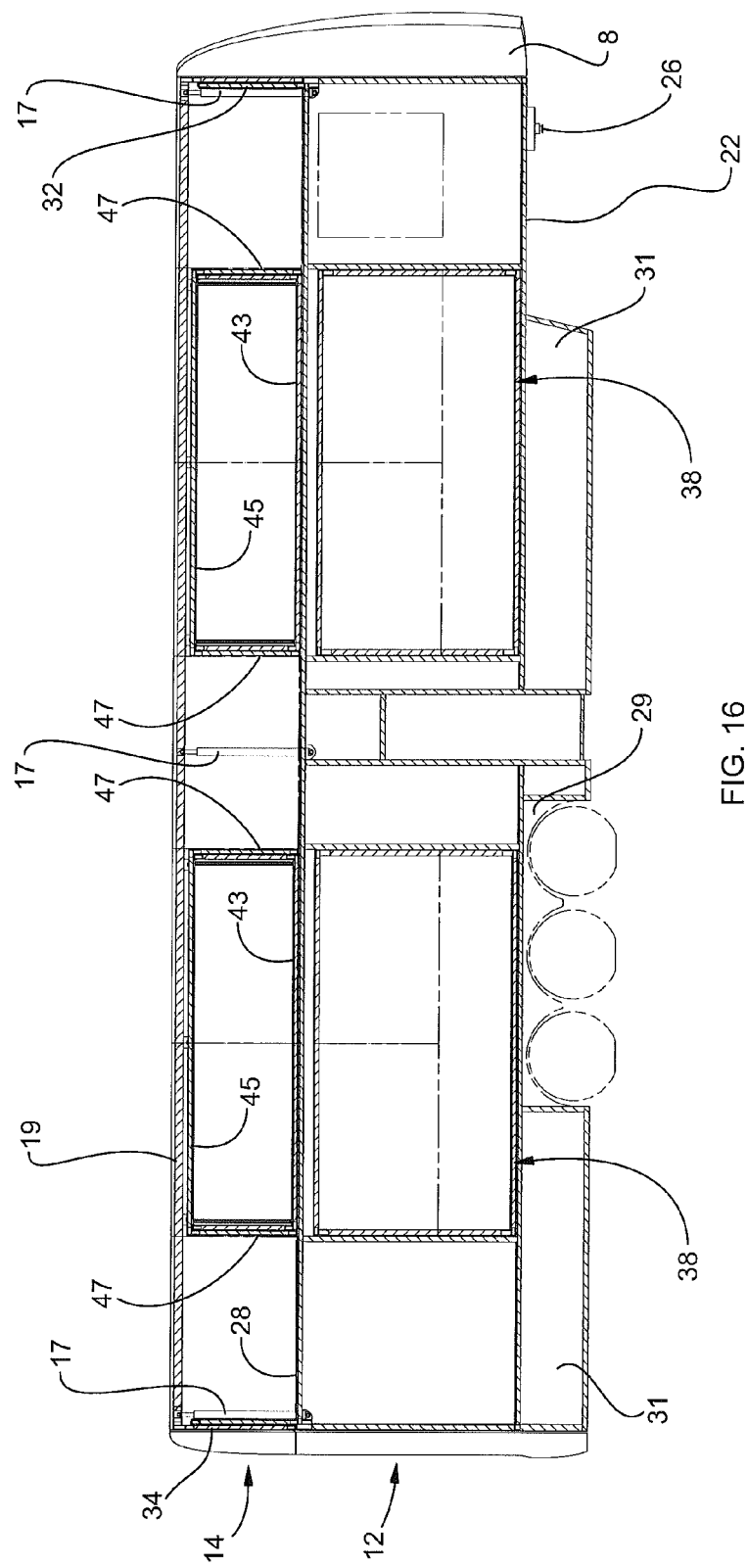
FIG. 16 is a sectional view of the trailer shown in FIG. 13 taken longitudinally along the center of the trailer.
Figure 17:
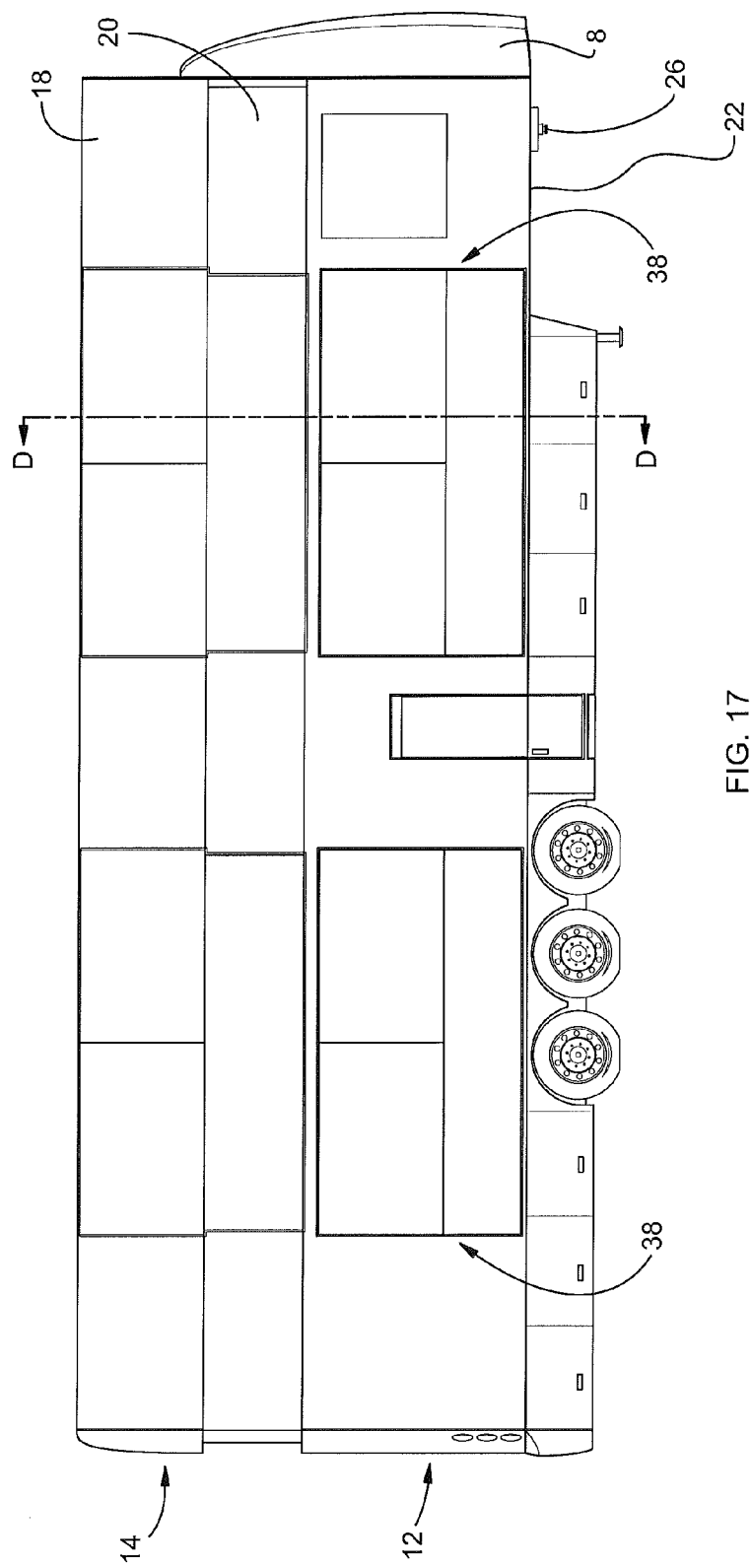
FIG. 17 is a side view of the trailer shown in FIG. 13 with the upper segment in its raised position.
Figure 18:
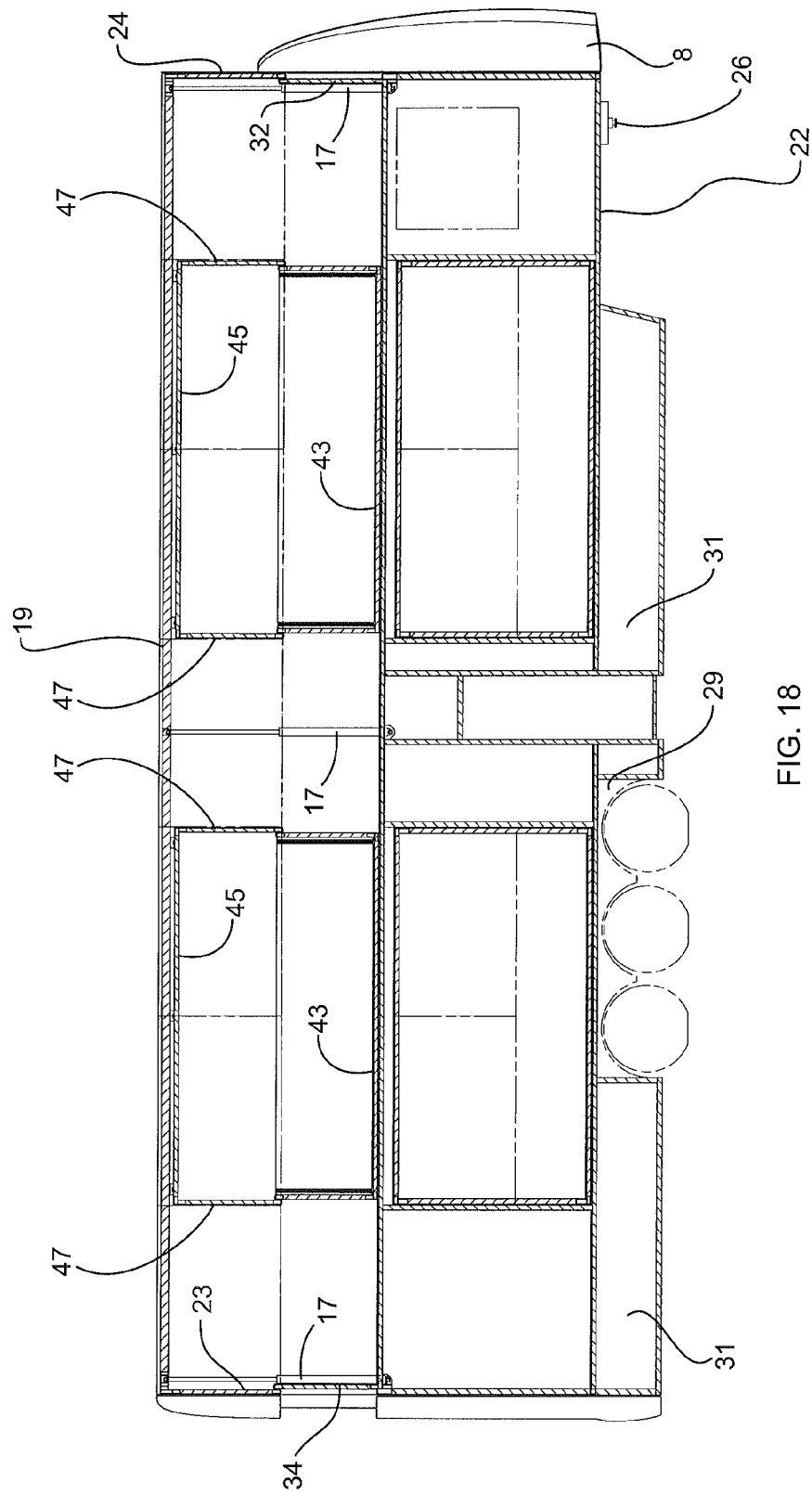
FIG. 18 is a sectional view of the trailer shown in FIG. 13 taken longitudinally along the center of the trailer.
Figure 19:
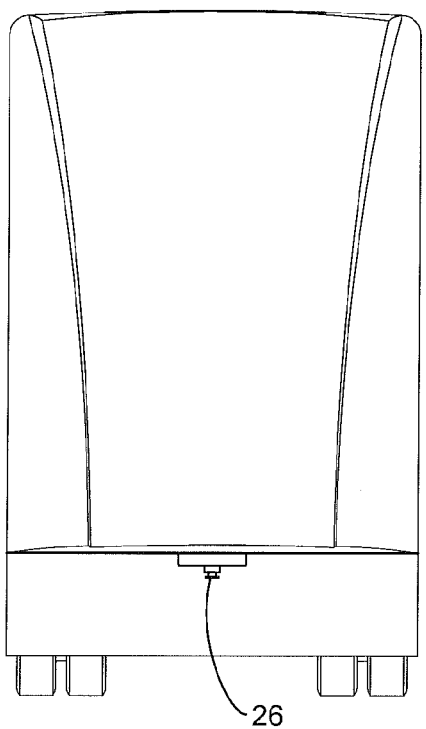
FIG. 19 is a front view of the trailer shown in FIG. 13.
Figure 20:
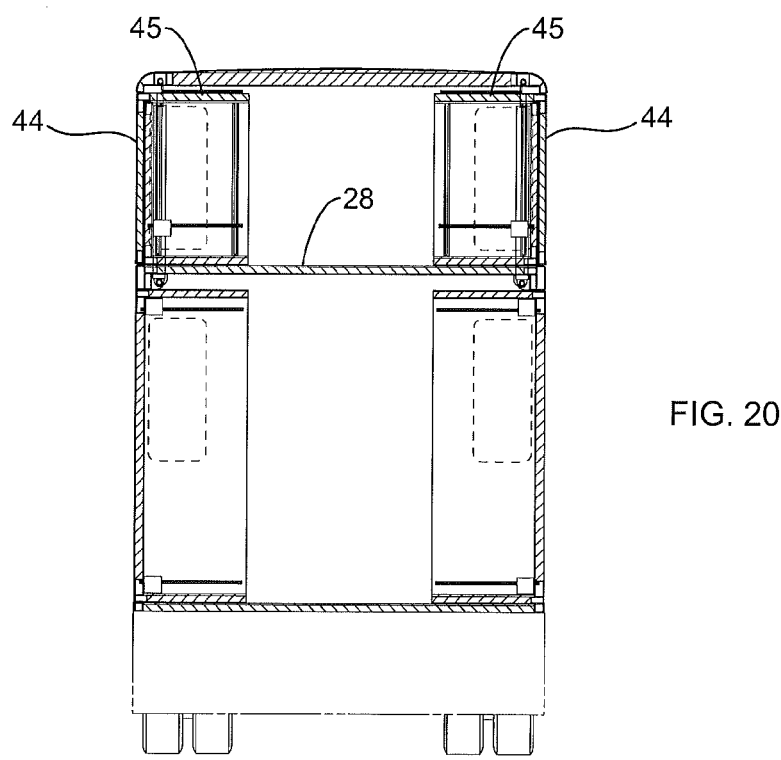
FIG. 20 is a sectional view of the trailer taken about the line C-C in FIG. 15.
Figure 21:
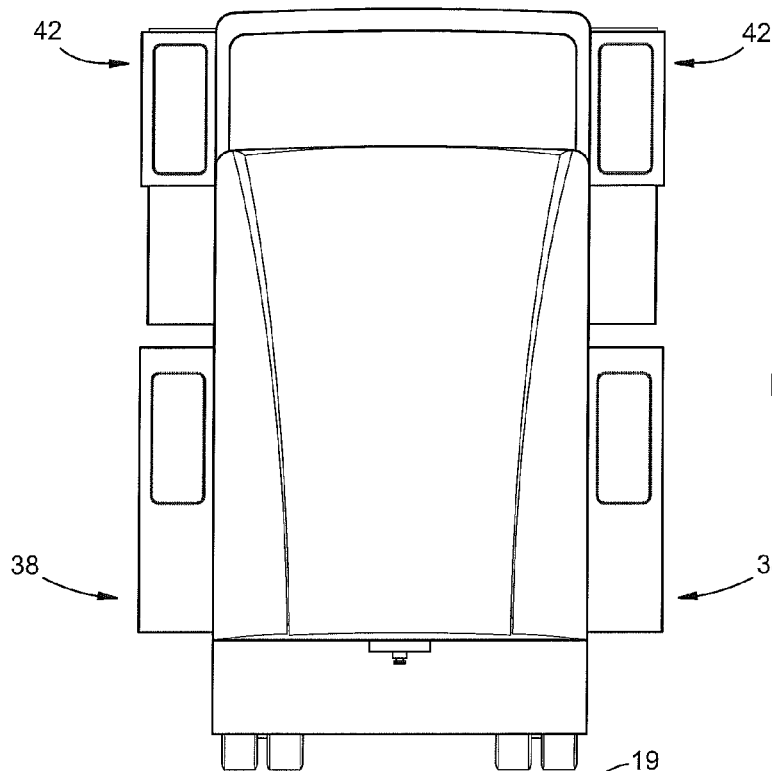
FIG. 21 is a front view of the trailer shown in FIG. 13 with the upper segment in its raised position and the extendable rooms in their extended position.
Figure 22:
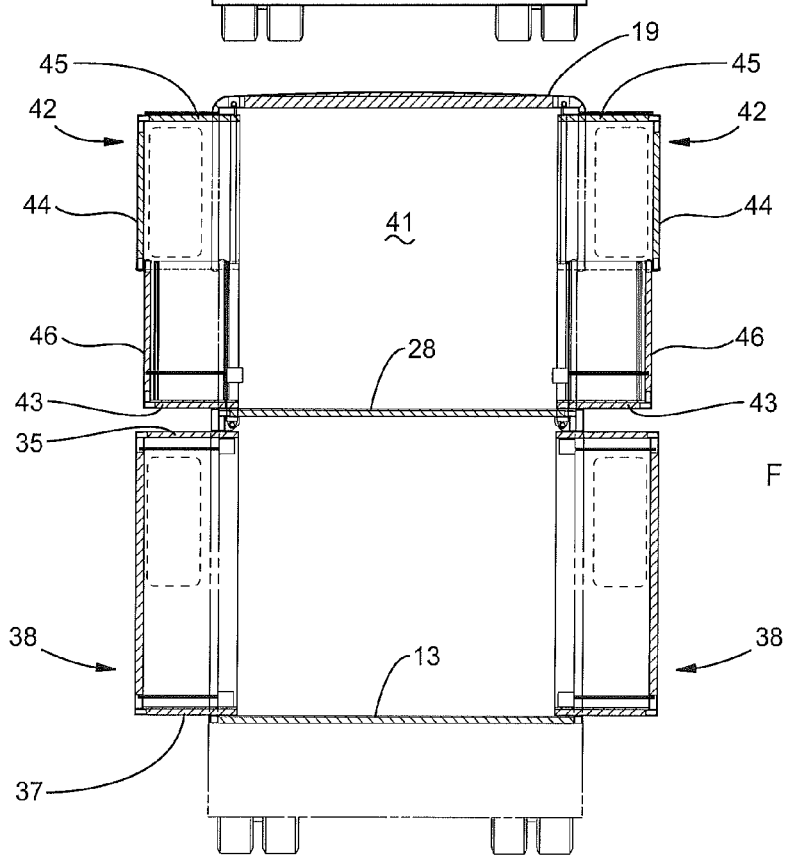
FIG. 22 is a sectional view taken about the line D-D in FIG. 17.
Figure 23:
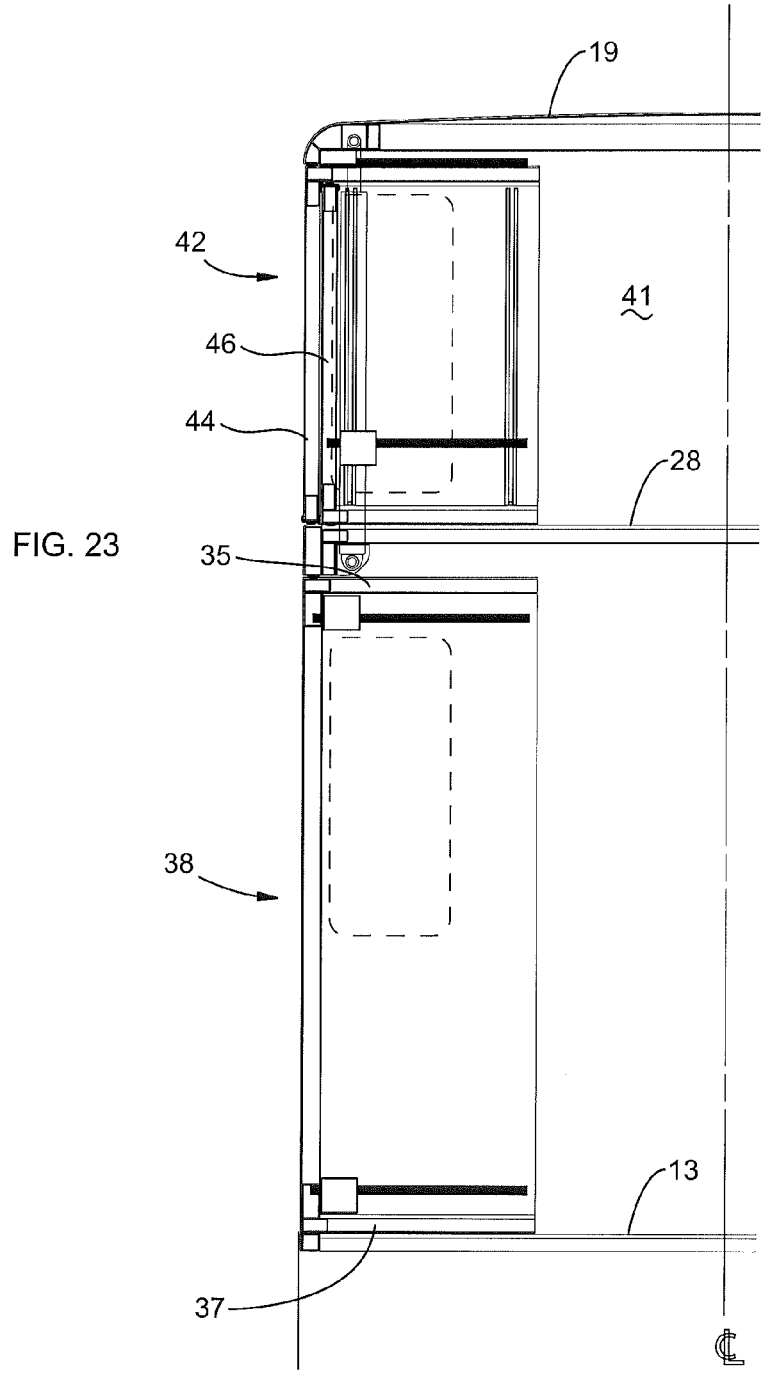
FIG. 23 is a sectional view taken about the line C-C in FIG. 15.
Figure 24:
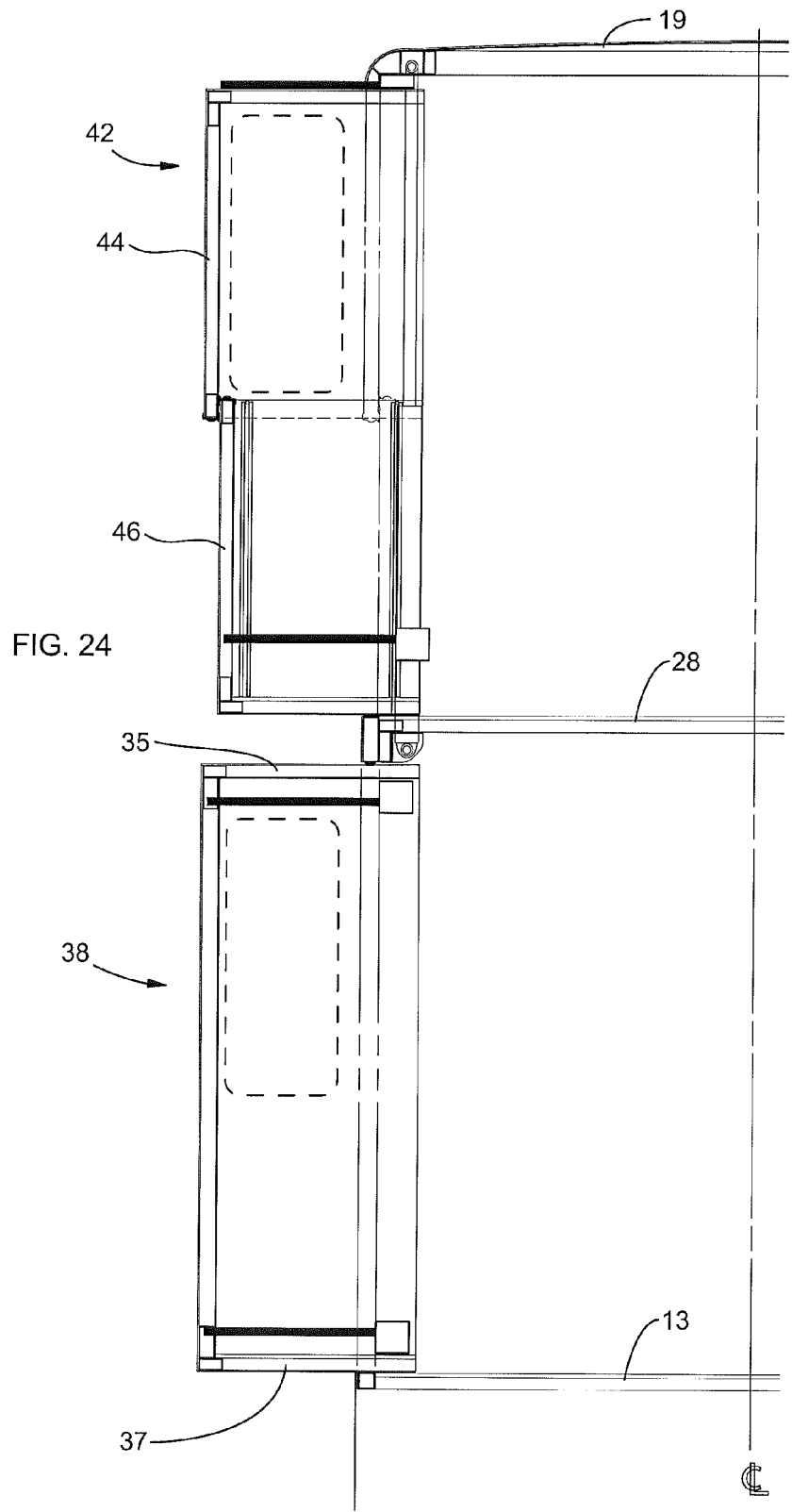
FIG. 24 is a sectional view taken about the line D-D in FIG. 17.
Figure 25:
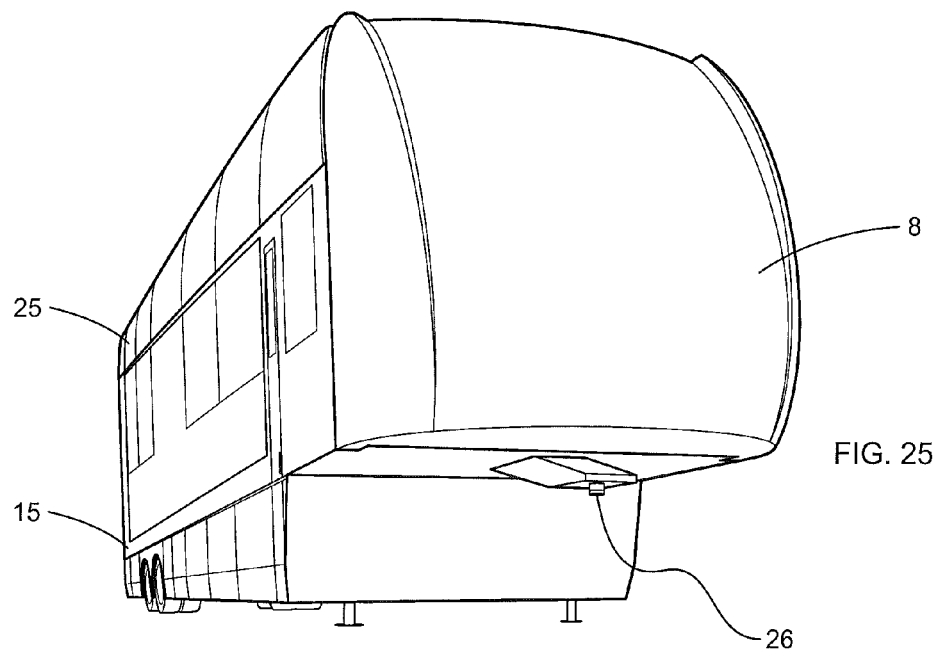
FIG. 25 is a perspective view of another embodiment of the expandable trailer of this invention with its upper segment in its lowered position and the extendable rooms in their retracted positions.

In another embodiment, as shown in FIGS. 13-24, the sidewalls 25 of the upper segment 18 contain upper extendable rooms 42. In this embodiment, the upper segment 18, extendable rooms 42 and second floor 28 define an upper living area 41. The upper extendable rooms 42 are slidably received in the upper body portion 14. The upper extendable rooms 42 have upper end walls 44 and lower end walls 46 that are in an overlapping, side by side relationship when the upper extendable rooms 42 are in their retracted positions, as shown in FIGS. 16 and 20. The lower end walls 46 are joined to floors 43 that slide over the second floor 28. The upper end walls 44 are joined to roofs 45 of the extendable rooms 42 that slide within the upper segment 18. Side walls 47 complete rooms 42. When the upper segment 18 is in its lowered position and the upper extendable rooms 42 are retracted, the walls 44 of the rooms 42 are flush with the side walls 15 of the lower body portion 12. The roofs 45 and upper end walls 44 are slidingly retained within the upper segment 18 so that when the upper segment 18 is raised, the upper walls 44 of the upper extendable rooms 42 rise with the upper segment 18. The upper walls 44 slide past the lower end walls 46 in a telescoping manner as the extendable rooms 42 are moved from their lowered to raised positions along with the upper segment 18. When the upper segment 18 is in its fully raised position, the upper and lower walls 44, 46 remain in overlapping contact. After the upper segment 18 is in its raised position, the upper extendable rooms 42 are extended, as shown in FIG. 22 and FIG. 24. As mentioned in the first embodiment, a screw drive 40 may be used to extend or retract each upper extendable room 42. The extendable rooms 38 extend independently of the upper extendable rooms 42. The floors 43 of the upper extendable rooms 42 are separate from the roofs 35 of the lower extendable rooms 38.

Figure 26:
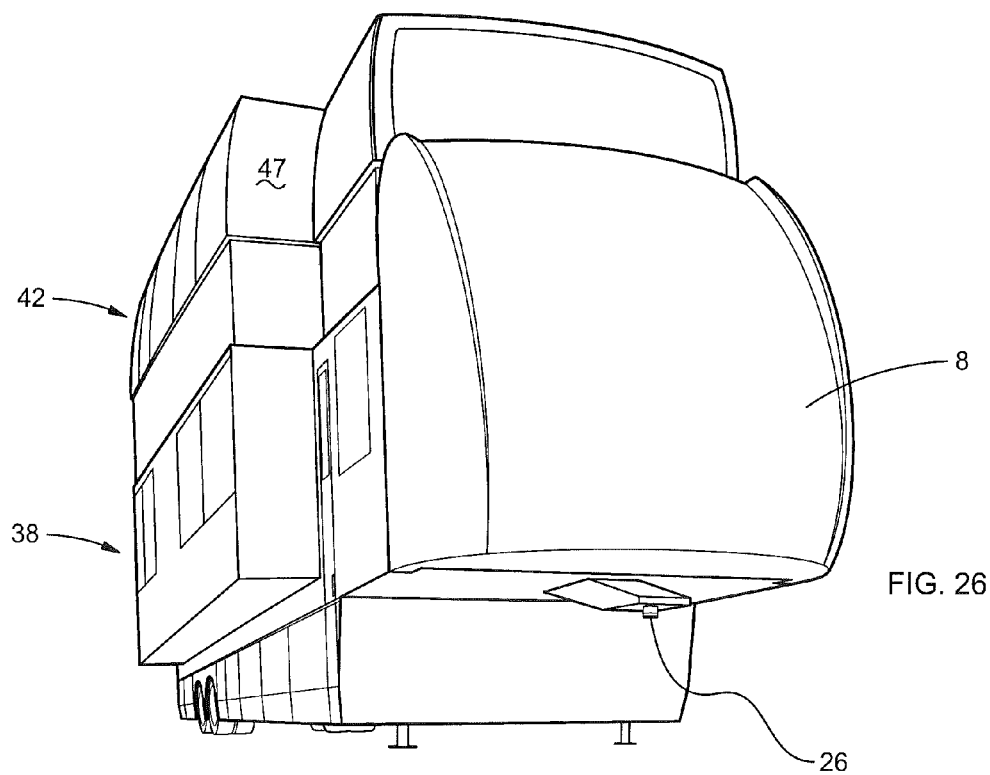
FIG. 26 is a perspective view of the trailer shown in FIG. 25 with the upper segment in its raised position and the extendable rooms in their extended position.
Figure 27:
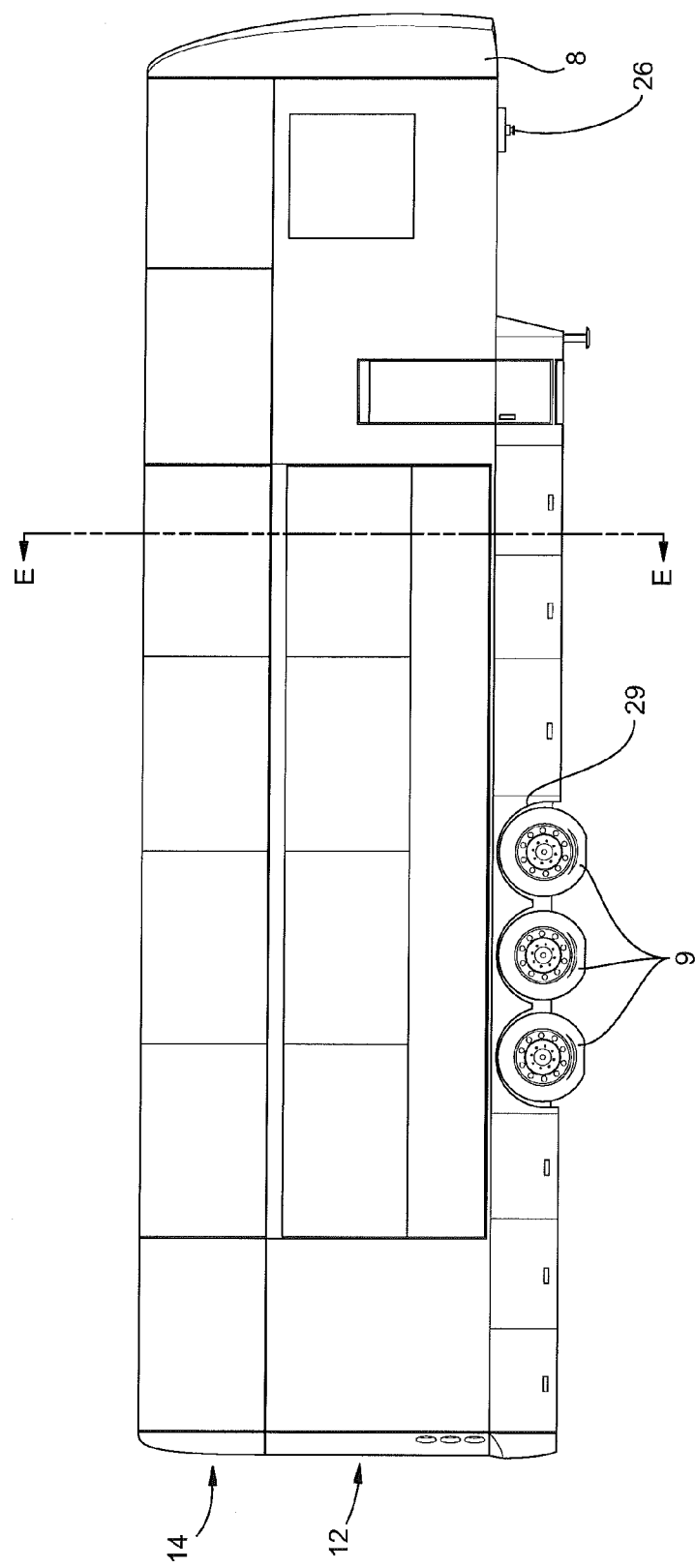
FIG. 27 is a side view of the trailer in FIG. 25 with the upper segment in its lowered position.
Figure 28:
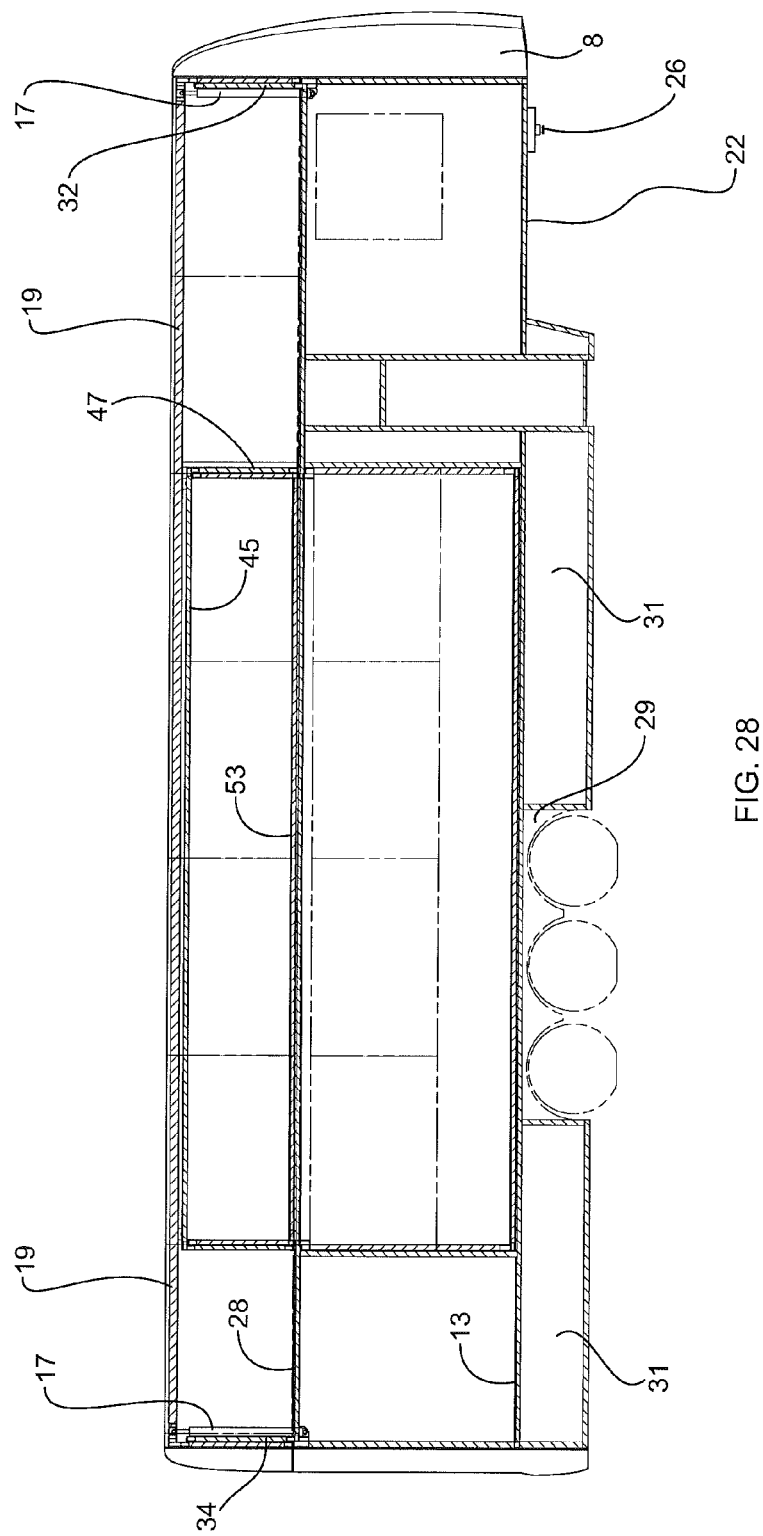
FIG. 28 is a sectional view of the trailer shown in FIG. 25 with the upper segment in its lowered position.
Figure 29:
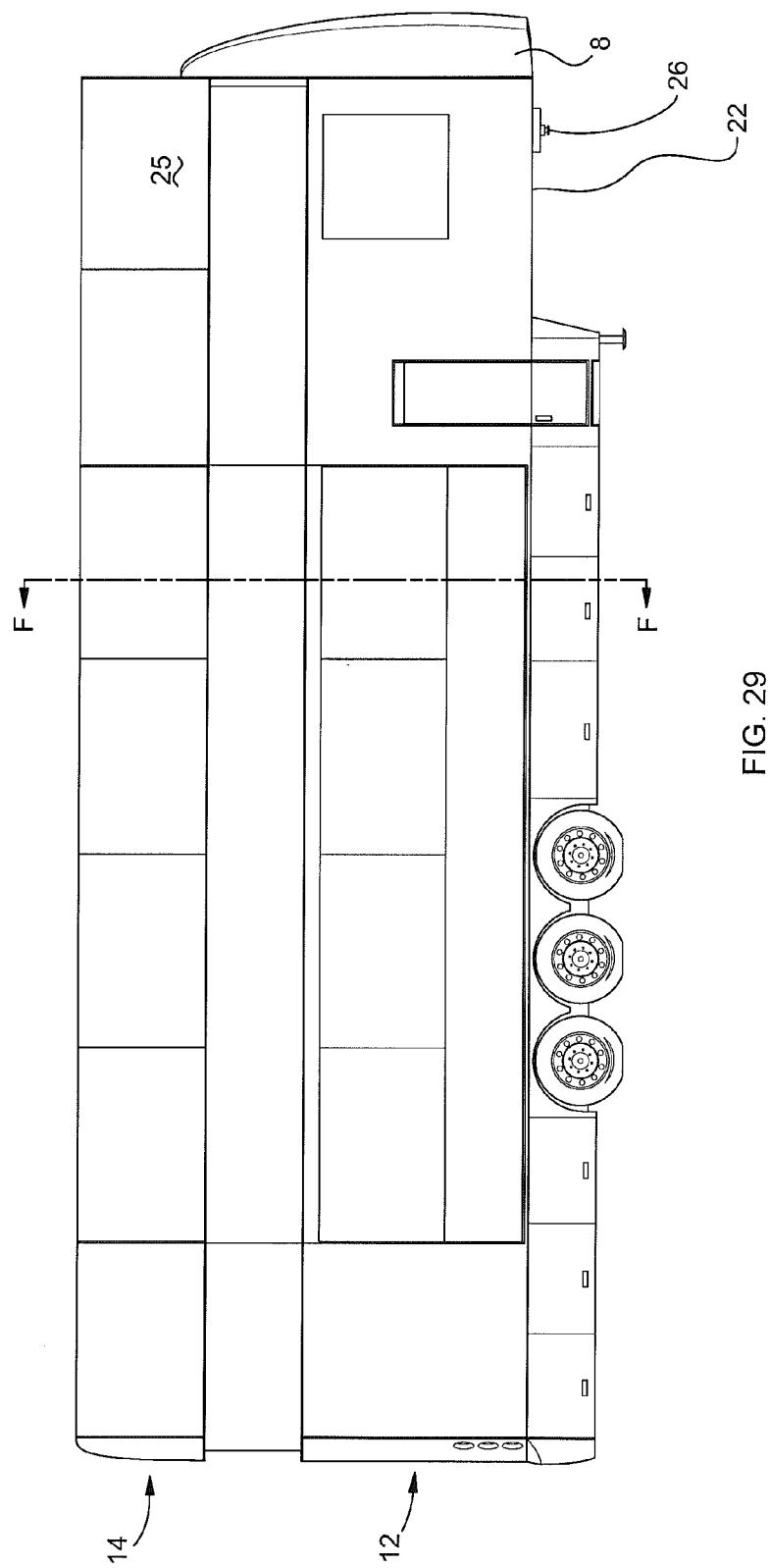
FIG. 29 is a side view of the trailer shown in FIG. 25 with the upper segment in its raised position.
Figure 30:
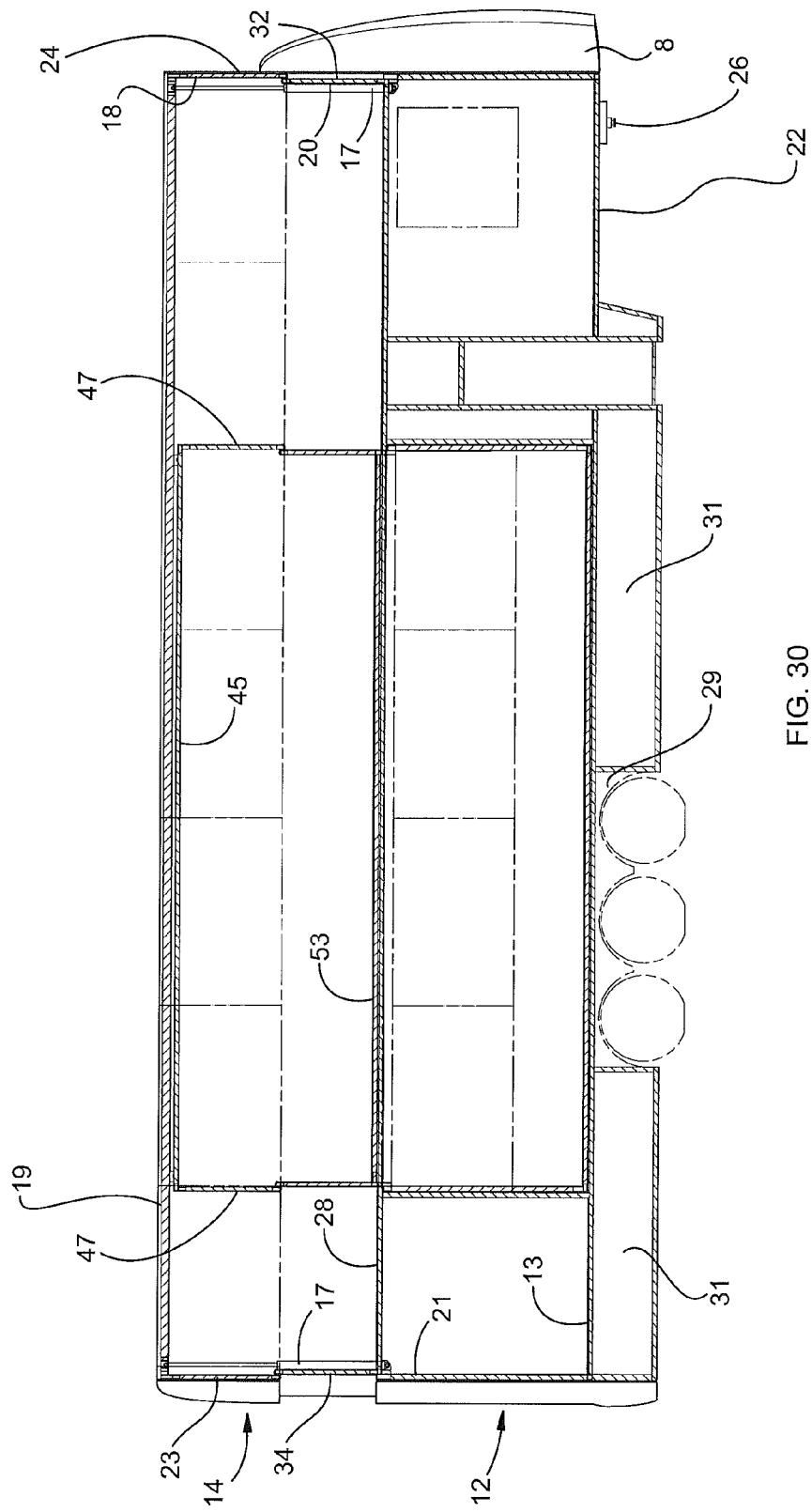
FIG. 30 is a sectional view of the trailer shown in FIG. 25 taken longitudinally along the center with the upper segment in its raised position.
Figure 31:
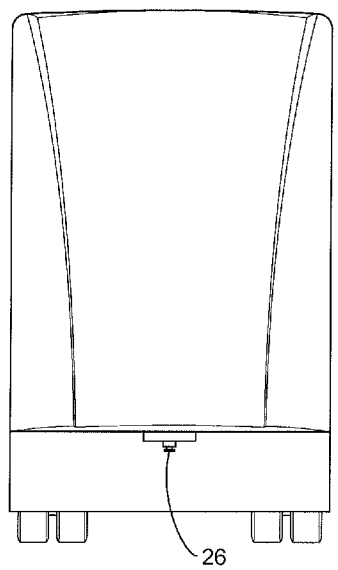
FIG. 31 is a front view of the trailer shown in FIG. 25.
Figure 32:
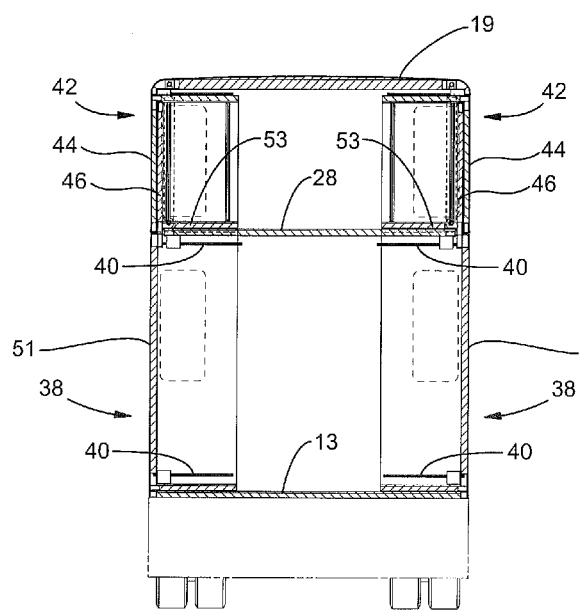
FIG. 32 is a sectional view of the trailer taken about the line E-E in FIG. 27.
Figure 33:
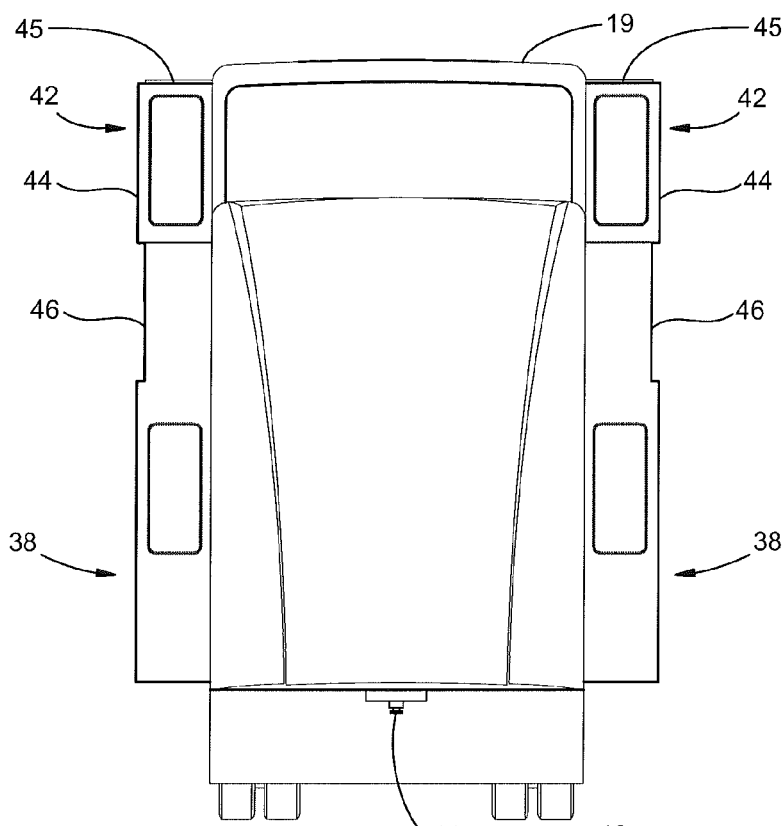
FIG. 33 is a front view of the trailer shown in FIG. 25.
Figure 34:
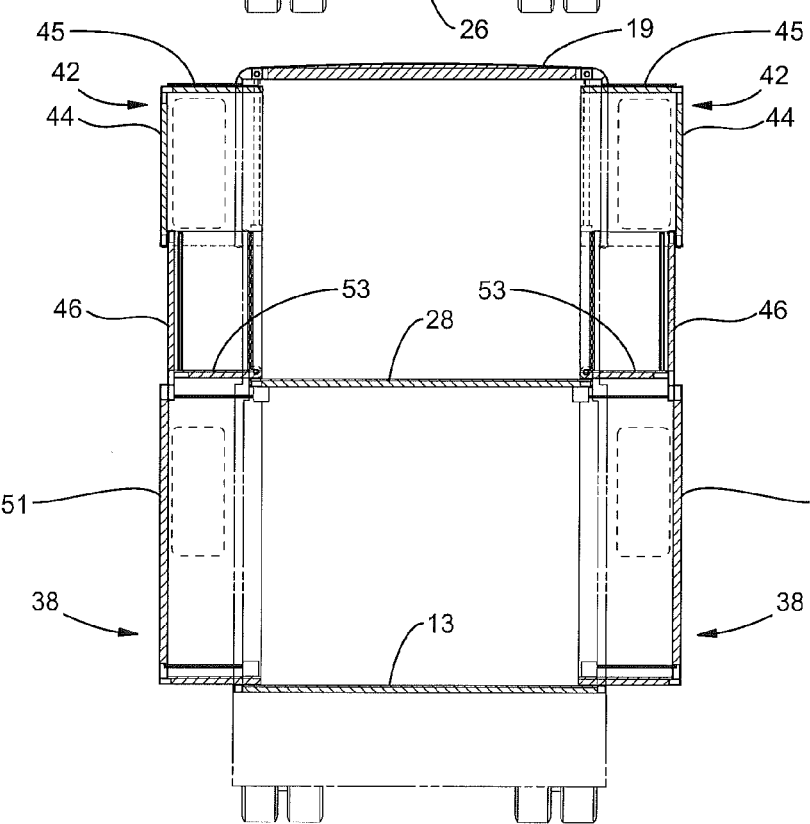
FIG. 34 is a sectional view taken about the line F-F in FIG. 29.
Figure 35:
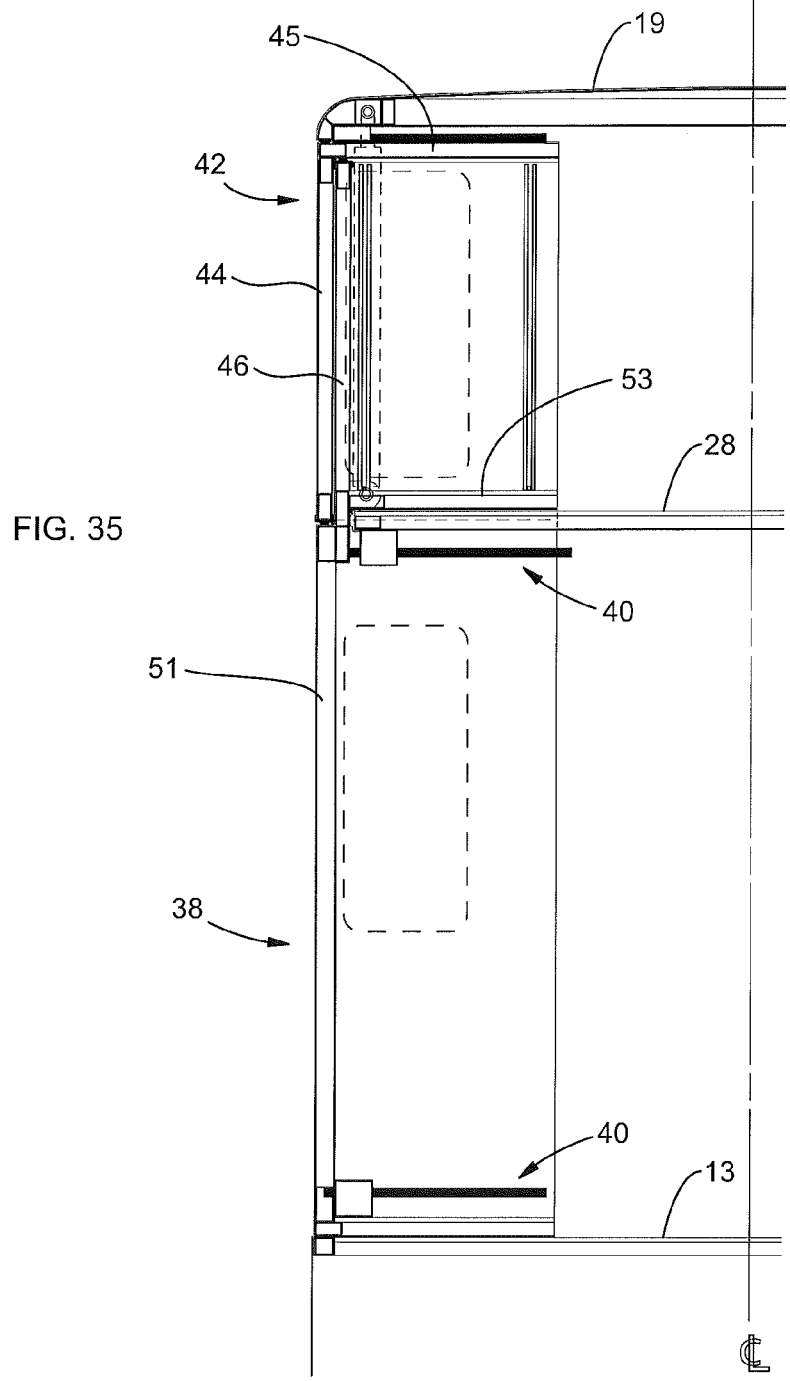
FIG. 35 is a sectional view taken about the line E-E in FIG. 27.
Figure 36:
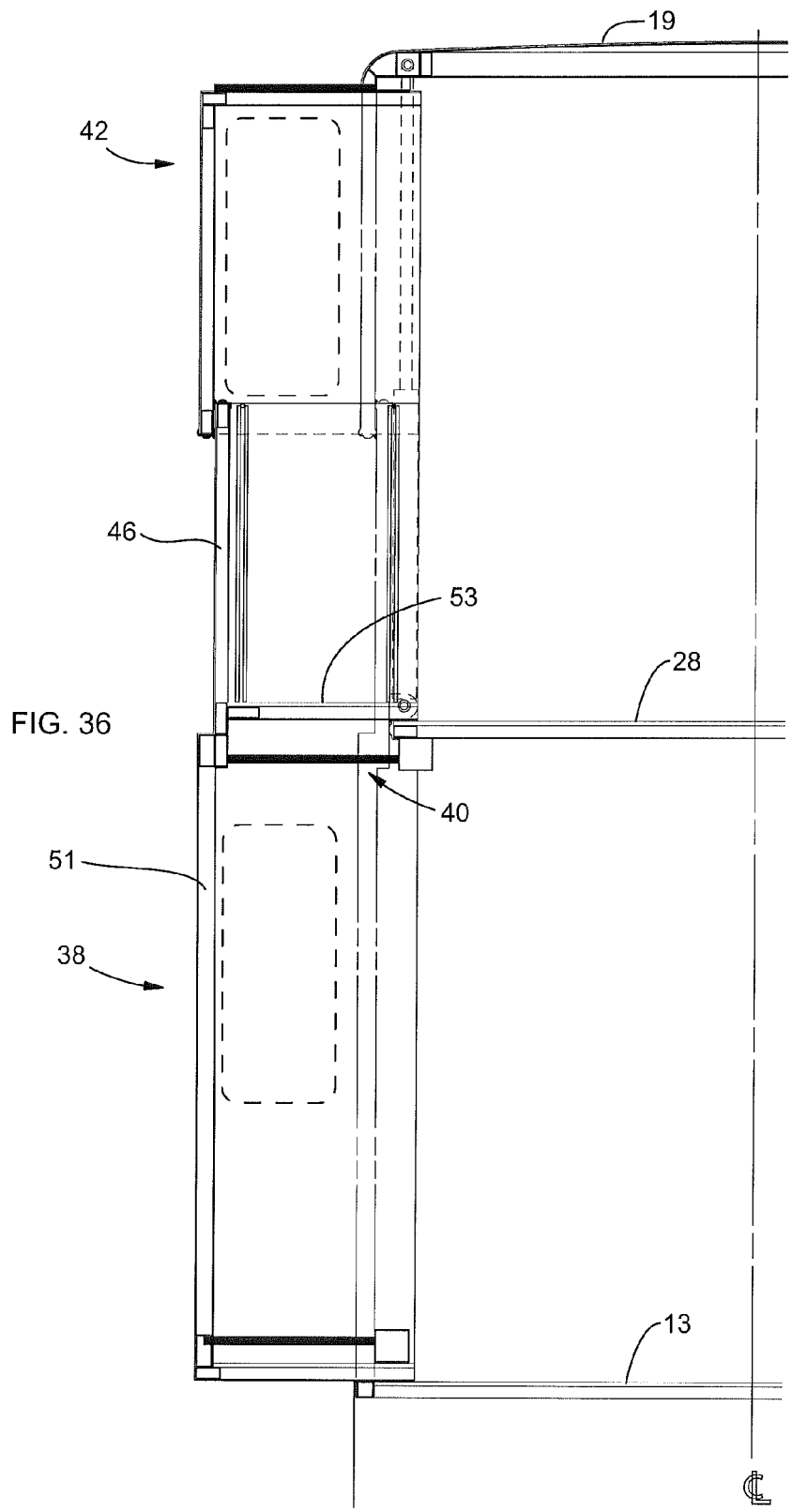
FIG. 36 is a sectional view taken about the line F-F in FIG. 29.

In another embodiment, as shown in FIGS. 25-36, the sidewalls 25, 15 of the upper segment 18 and lower body portion 12 contain extendable rooms. The upper extendable rooms 42 and lower extendable rooms 38 are coordinated to extend simultaneously. As in the second embodiment, the upper extendable rooms 42 have an upper end wall 44 and a lower end wall 46 that are in an overlapping, side by side relationship when the upper extendable rooms 42 are in their retracted position, as shown in FIGS. 28 and 32. The lower end wall 46 of the upper extendable room 42 also forms a part of the end wall 51 of the lower extendable room 38. A floor 53 of the upper extendable room 42 is attached where the lower end wall 46 and end wall 51 meet, as shown in FIGS. 32 and 34. The floor 53 of the upper extendable room 42 slides over the second floor 28. This is best shown in FIG. 34. When the upper segment 18 is in its lowered position, the upper extendable rooms 42 are in their retracted positions, and the lower extendable rooms 38 are also retracted, all of the extendable rooms 42, 38 are flush with the side walls 15 of the lower body portion 12. The roofs 45 and upper end walls 44 are slidingly retained within the upper segment 18 so that when the upper segment 18 is raised, the upper end walls 44 of the upper extendable rooms 42 rise with the upper segment 18. The upper end walls 44 slide past the lower end walls 46 in a telescoping manner as the extendable rooms 42 are moved from their lowered to raised position along with the upper segment 18. After the upper segment 18 is in its raised position, the upper extendable rooms 42 and lower extendable rooms 38 are extended, as shown in FIGS. 26 and 34.

The above described invention is not to be limited to the details given but may be modified within the scope of the following claims.

What is claimed is:

1. A trailer comprising:
   a lower body portion having a first floor, a front wall, a back wall and a pair of opposite side walls;
   an upper body portion disposed over said lower body portion and having a movable upper segment and a fixed lower segment which is connected to said lower body portion, said lower segment interfacing within said upper segment, said upper segment having a front wall, a back wall and a pair of opposite side walls and a roof, said lower segment having a front wall, a back wall and a pair of opposite side walls, and a second floor positioned between said roof of said upper segment and said first floor of said lower body portion, said upper segment being shiftable relative to said lower segment such that said upper segment has a raised and a lowered position relative to said lower segment and said lower body portion, said front wall of said upper segment retracting behind a nose of said trailer so that no portion of said upper segment remains exposed when said upper segment is in its lowered position; and
   an actuator for raising and lowering said upper segment relative to said lower segment.

2. A trailer as claimed in claim 1, wherein at least one of said side walls of said lower body portion accommodates an extendable room which provides additional interior space within said trailer, and an actuator for extending and retracting said extendable room.

3. A trailer comprising:
   a lower body portion having a front wall;
   a back wall;
   a first floor extending from said front wall to said back wall;
   a pair of opposite side walls;
   a goose neck section between said front wall and said back wall adapted for being removably secured to a fifth wheel hitch, said first floor being substantially planar;
   an upper body portion disposed over said lower body portion and having a movable upper segment and a fixed lower segment which is connected to said lower body portion, said lower segment interfacing within said upper segment, said upper segment having a front wall, a back wall a pair of opposite side walls and a roof, said lower segment having a front wall, a back wall and a pair of opposite side walls, and a second floor positioned between said roof of said upper segment and said first floor of said lower body portion, said upper segment being shiftable relative to said lower segment such that said upper segment has a raised and a lowered position relative to said lower segment and said lower body portion, said upper segment being retractable behind a nose of said trailer so that no portion of said upper segment remains exposed when said upper segment is in its said lowered position; and
   an actuator for raising and lowering said upper segment relative to said lower segment.

4. The trailer as claimed in claim 3, wherein at least one of said side walls of said lower body portion accommodates an extendable room which provides additional interior space within said trailer, and an actuator for extending and retracting said extendable room.

\* \* \* \* \*